United States Patent [19]
Kinebuchi et al.

[11] Patent Number: 5,912,743
[45] Date of Patent: Jun. 15, 1999

[54] TERMINAL DEVICE

[75] Inventors: Tadashi Kinebuchi; Hiroyuki Baba; Masanori Konishi; Akihiro Gomi, all of Suwa, Japan

[73] Assignee: Seiko Epson Corporation, Tokyo, Japan

[21] Appl. No.: 08/664,463

[22] Filed: Jun. 14, 1996

[30] Foreign Application Priority Data

| Jun. 16, 1995 | [JP] | Japan | 7-150619 |
| Jul. 27, 1995 | [JP] | Japan | 7-192289 |
| Sep. 22, 1995 | [JP] | Japan | 7-269354 |

[51] Int. Cl.$^6$ ........................................ H04N 1/32
[52] U.S. Cl. .................. 358/442; 358/468; 345/348; 434/428
[58] Field of Search ...................... 358/400, 434, 358/442, 468; 395/114–116, 967; 345/173, 145, 146, 400, 441, 348, 349; 434/428, 429; H04N 1/32

[56] References Cited

U.S. PATENT DOCUMENTS

| 4,468,750 | 8/1984 | Chamoff et al. . |
| 4,547,851 | 10/1985 | Kurland . |
| 4,553,222 | 11/1985 | Kurland et al. . |
| 4,851,994 | 7/1989 | Toda et al. . |
| 5,003,472 | 3/1991 | Perrill et al. . |
| 5,128,862 | 7/1992 | Mueller . |
| 5,235,509 | 8/1993 | Mueller et al. . |
| 5,262,938 | 11/1993 | Rapoport et al. . |
| 5,377,319 | 12/1994 | Kitahara et al. . |
| 5,454,721 | 10/1995 | Kuch . |
| 5,566,069 | 10/1996 | Clark, Jr. et al. . |
| 5,594,920 | 1/1997 | Ebina et al. . |
| 5,606,374 | 2/1997 | Bertram . |
| 5,657,461 | 8/1997 | Harkins et al. . |

FOREIGN PATENT DOCUMENTS

| 0 140 302 A2 | 5/1985 | European Pat. Off. . |
| WO 89/00321 | 1/1989 | France . |

OTHER PUBLICATIONS

InformationWeek, Aug. 16, 1993, USA, p. 49 XP002037298 Wilson L: "Arby's IT: rare and well done" See 'Here's the beef' and 'Behind the scenes'.

*Primary Examiner*—Kim Yen Vu
*Attorney, Agent, or Firm*—Mark P. Watson

[57] ABSTRACT

An order-taking terminal device enables a customer to order food, but can respond rapidly to changes and additions to the menu. When this terminal device starts up, it receives an operating program and image data from main management equipment. The order-taking terminal device stores the thus received operating program and image data and displays a menu screen on a display screen on the basis of the thus stored operating program and image data.

32 Claims, 26 Drawing Sheets

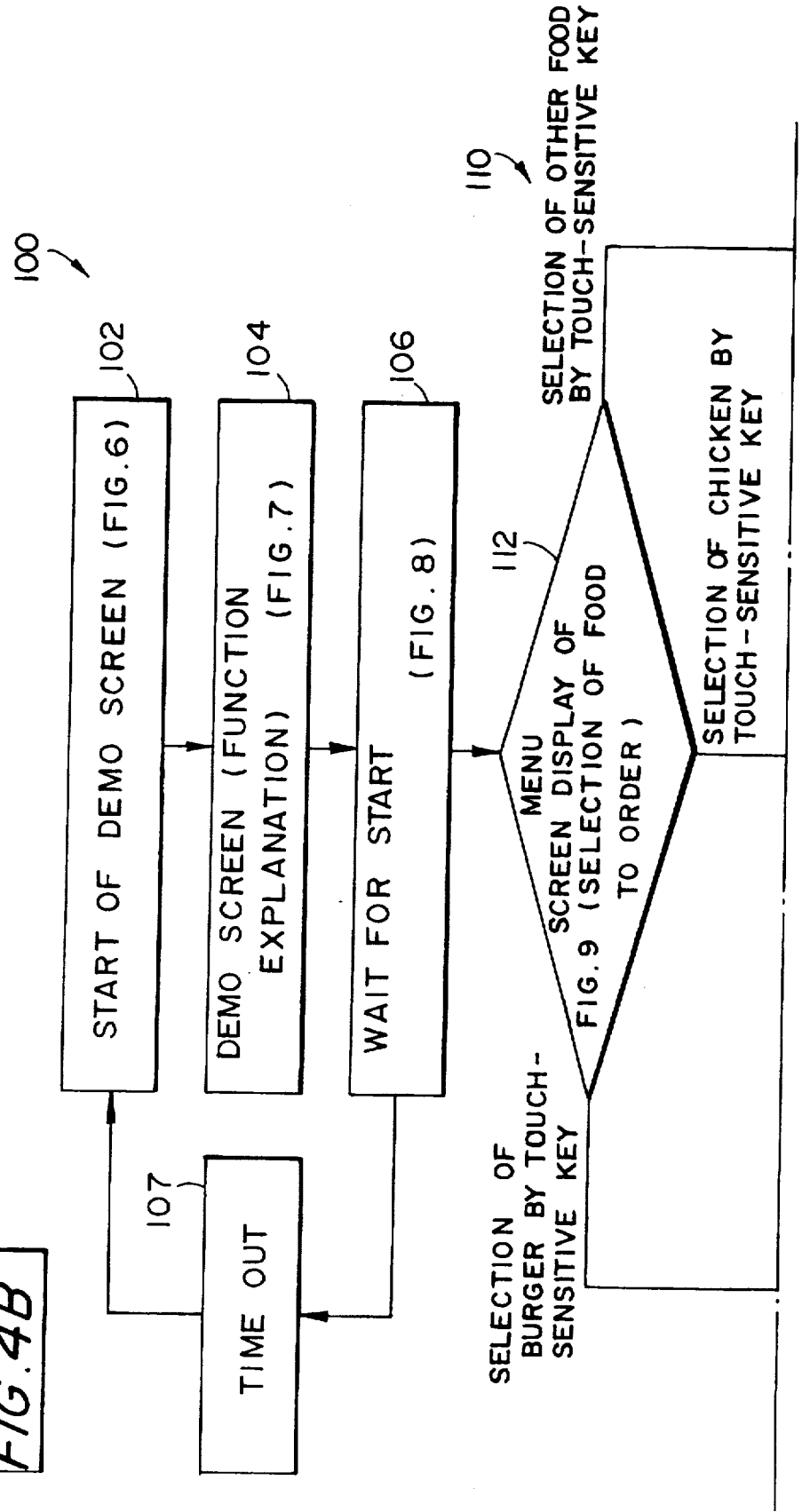

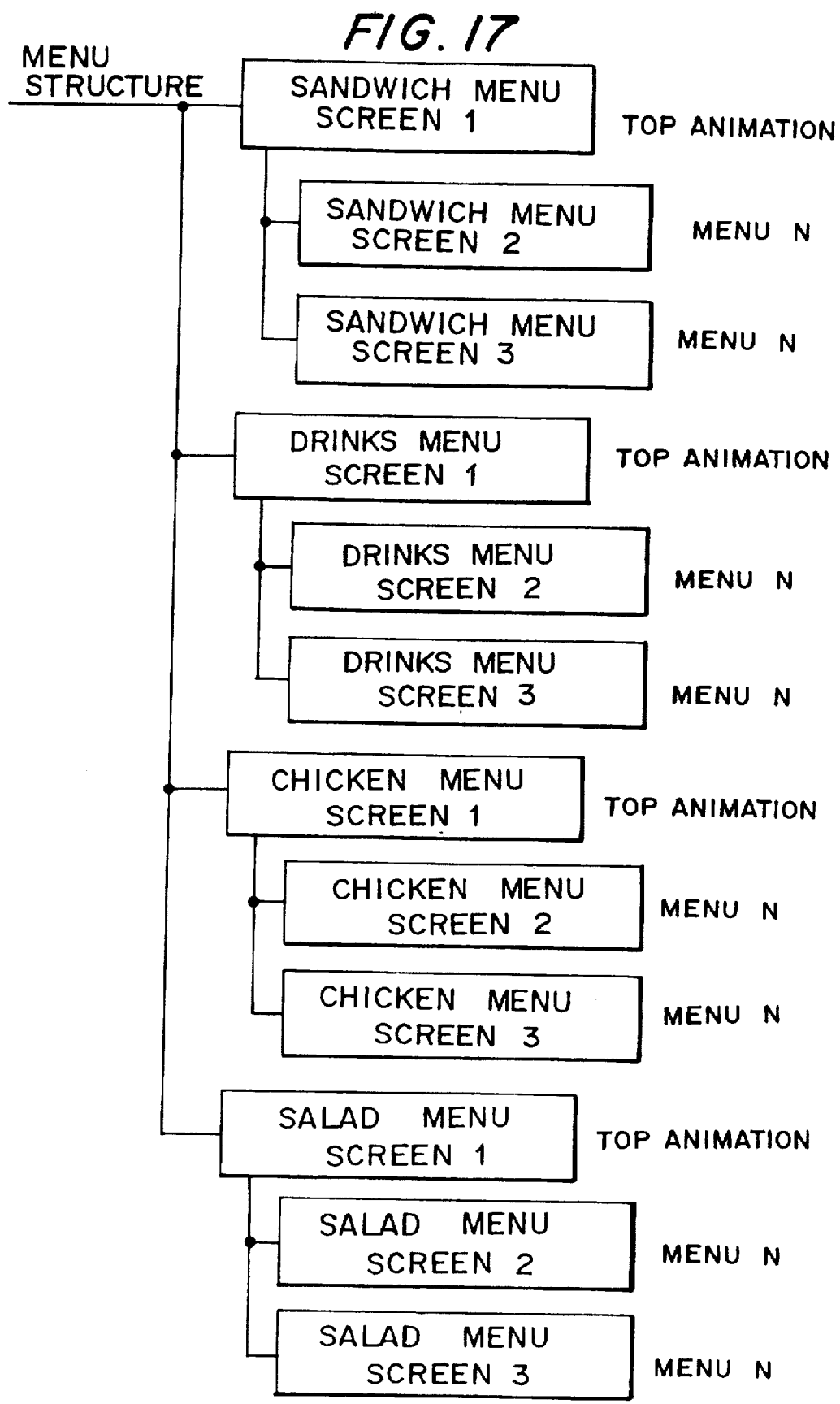

TERMINAL DEVICE

BACKGROUND OF THE INVENTION

The present invention relates to a terminal device, in particular, to a terminal device by which a user can transmit data while viewing a screen on the terminal device.

DESCRIPTION OF THE PRIOR ART

The system generally used for administering orders in a restaurant or the like is such that a waiter or waitress takes each customer's order and conveys it to the kitchen. However, an order management system of this type has a problem in that the expenses involved in employing waiting staff increases the unit price of the food.

In establishments such as fast-food restaurants that have recently become common, a system is used in which the customer has to approach a counter to order and again to pick up the ordered food.

However, an order management system of that type has a problem in that it places a large burden on customers because they have to return to the counter every time they order, and they have to wait in line at the counter if the restaurant is busy.

In order to solve these problems, the use of an order management system has been considered in which a main piece of management equipment for order management (a host computer) is combined with a plurality of terminal devices for ordering that are provided at the customers' tables. Since this order management system makes it possible for a customer to make an order while viewing image data for ordering that is displayed on a terminal device, and the resultant order can be processed by the main management equipment, it can solve both of the previously mentioned problems concerning staff expenses and the load on the customers.

Unfortunately, it is not possible for a customer to obtain a good visualization of the dishes available for order, simply from an order list displayed on a terminal device. In such a case, a problem occurs in that customers become reluctant to use this system to order food.

SUMMARY OF THE INVENTION

In the light of the above described problems, a first objective of the present invention is to provide a terminal device which can manage with only a small quantity of data to transfer, and which enables a user to input data to be transferred in an easy-to-understand fashion.

Another objective of the present invention is to provide a terminal device which is capable of transferring interactive data to and from another device, wherein this data is easy for a user to understand and is also small in quantity.

A further objective of the present invention is to provide a terminal device which is capable of responding flexibly to changes in the image data used for data transfer management.

In order to achieve the above objectives, a first aspect of the present invention relates to a terminal device for transmitting data to another device, comprising:

input means;

display means;

storage means for storing image data for a data transmission management screen wherein at least part of the image data is presented as a dynamic image, and an operating program for reproducing the image data in accordance with predetermined rules and managing data transmission; and computation control means for managing data transmission;

wherein the computation control means, comprises:

image displaying means for reading the image data and displaying a data transmission management screen on the display means based on the operating program; and control means for generating transfer data based on the operating program and input from the input means in response to the data transmission management screen, and managing the transmission of data to the other device.

In accordance with the terminal device of the present invention, a data transmission management screen is displayed on the display means to enable a user to visually verify the details of data to be transmitted to another device and the procedure required for transmitting this data.

In particular, since part of the data for these management screens is presented as a dynamic image, this aspect of the invention makes it possible to use dynamic animations and cartoon characters to express the data transmission procedure and details of this data in a visual form that is easy for a user to understand.

The user can easily input data from the input means in response to this data transmission management screen, while receiving visual confirmation of this data to be transmitted. The thus-input data is sent as transmit data to the other device.

From the above description, it is clear that the terminal device in accordance with this aspect of the invention displays the relationship between the displayed screens and the data to be transmitted, so that the user can check the details of the data to be sent and the operating sequence for sending this data in a visual, easy-to-understand manner, and thus the terminal device is extremely convenient to use.

Moreover, since the basic concept of this terminal device is such that the image data itself is not transmitted during data transfer, only data relating to that image data is transmitted, the quantity of data transferred is small and thus the data can be transmitted rapidly.

A second aspect of the present invention relates to a terminal device for transferring interactive data to and from another device, comprising:

input means;

display means;

storage means for storing image data for a data transmission management screen wherein at least part of the image data is presented as a dynamic image, and an operating program for reproducing the image data in accordance with predetermined rules and managing data transmission; and computation control means for managing data transmission;

wherein the computation control means, comprises:

image displaying means for reading the image data and displaying a data transmission management screen on the display means based on the operating program; and control means for generating first order data based on the operating program and an input from the input means in response to the data transmission management screen, transmitting the first data to the other device, and managing to display a screen with details corresponding to interactive second data on the image displaying means based on the second data received from the other device.

The terminal device of this aspect of the invention enables the interactive transfer of data to and from another device, in a manner that is easy for the user to understand and requires little data.

This terminal device is particularly characterized in that at least part of a data transfer management screen is presented as a dynamic image such as an animation. This makes it possible to manage the transfer of data that is visually easy for the user to understand, and thus enable the implementation of a terminal device that is extremely easy for the user to understand and use.

In a third aspect of the present invention:

the image data is image data for an order management screen;

the operating program reproduces image data for order management in accordance with predetermined rules and manages data transmission for order management;

the image displaying means reads out the image data based on the operating program and displays the order management screen on the display means; and the control means generates order management data based on the operating program and an order input from the input means in response to the order management screen, and controls the transmission of the order to the other device.

In a fourth aspect of the present invention:

the image data is image data for an order management screen;

the operating program reproduces image data for order management in accordance with predetermined rules and manages data transmission for order management;

the image displaying means reads out the image data based on the operating program and displays the order management screen on the display means; and the control means generates first order management data based on the operating program and an order input from the input means in response to the order management screen, transmits the first order management data to the other device, and manages to display an order management screen with details corresponding to interactive second data on the image displaying means based on the second data received from the other device.

In accordance with this aspect of the invention, since the user can input an order while viewing an order management screen wherein at least part is presented as a dynamic image, an order-taking terminal device can be implemented that is extremely easy to understand and convenient to use.

In particular, this aspect of the invention makes it possible to transfer data for order management in an interactive form to and from another device. Thus, when food has been ordered, for example, data communications can be used to inform the user that the ordered food is ready. In addition, if the user orders the fetching of predetermined data, the thus ordered data can be received from the other end of the system.

In a fifth aspect of the present invention:

the input means is a touch-sensitive panel disposed on the display means in a predetermined mutual relationship with the management screen.

Disposing a touch-sensitive panel on the display means in a predetermined mutual relationship with the management screen in this manner enables the user to input order data easily, merely by touching a predetermined position on the displayed order management screen. This makes it possible to implement a terminal device that is convenient for a user to use.

In a sixth aspect of the present invention:

the image data displays a menu screen representing a plurality of management categories as the management screen.

Displaying the management screen as a menu screen in this manner makes it possible to implement a terminal device that is even more convenient to use.

In this regard, it is preferable that managemental details, such as details of the data to be sent, are displayed on the menu screen by using readily understandable animations or photographs.

In a seventh aspect of the present invention:

the storage means stores image data for an order menu screen representing a plurality of ordering categories as the management screen; and the control means converts an ordering category selected by the input means into code data and transmits the code data as the first data, and displays an order management screen with details which are code data received as the second data from the other device on the image displaying means.

The terminal device of this aspect of the present invention enables the input of data to be transmitted by simply selecting a desired ordering category, thus making it possible to implement a terminal device that is extremely convenient to use.

In particular, since the transmitted data is transferred to and from the other device in a converted form as code data, the terminal device of this aspect of the invention has the advantage of managing with an extremely small quantity of data to be transferred.

In an eighth aspect of the present invention:

the storage means stores a plurality of sets of the image data and operating programs; and the control means manages data transmission based on remaining sets of image data and operating program during a waiting time during which data transmission is being managed based on a predetermined set of image data and operating program.

In accordance with this aspect of the terminal device of the present invention, another data transfer management operation can be performed during the waiting time of a predetermined data transfer management operation, so that the user can make use of the waiting time to transfer other data effectively.

In a ninth aspect of the present invention:

the storage means stores a plurality of sets of the image data and associated display operating programs for product ordering and information ordering; and the control means performs ordering control based on image data for information ordering and an associated display operating program from a time at which the first code data is transmitted until when the second code data is received, during ordering control based on image data for product ordering and an associated operating program.

It often happens that the time required to transfer an order for information through a circuit and receive that information is shorter that the time taken between placing the order for a dish until the food is ready. This aspect of the invention makes use of the waiting time that occurs when a product such as a food dish is being ordered, between the ordering of the dish and the time that the food is ready, to provide ordering control for information. This ensures that the user does not waste this waiting time, and can use it efficiently to obtain other information.

In a tenth aspect of the present invention:

the control means comprises means for writing into the storage means the image data and an associated display operating program which are received from the other device.

The terminal device in accordance with this aspect of the present invention receives image data and an associated operating program for a screen to be displayed from an external apparatus, and controls the writing of this data into the storage means. In other words, the image data and operating program that arrive from the external apparatus are in a over-writable form.

Since the present invention makes it possible to respond rapidly to changes in the images to be displayed, it enables the implementation of a terminal device that is extremely applicable to a wide range of applications and is convenient to use.

It is preferable that this transfer and writing of the image data and operating program is performed during a time band in which the terminal device is not usually in use.

In a eleventh aspect of the present invention:

the image data displays hierarchical menu screens representing a plurality of management items as the management screen.

The use of hierarchical menus in this manner makes it possible to utilize a limited display space efficiently and display screens that are easy for the user to understand.

In a twelfth aspect of the present invention:

the image data includes transmission items divided into a number of major categories according to type, items belonging to each of the major categories further divided into a tree structure within that major category, so as to display order management menu screens are displayed in a hierarchy; and the operating program displays a menu screen representing items in a level next to a hierarchical level corresponding to one of root and node portions of the displayed tree structure, the next level belonging to a category selected by a user from categories of the hierarchical level, and the operating program switches menu screens representing each of items belonging to a same leaf portion of the tree structure to display a menu screen based on screen changing order from the second control means.

In a thirteenth aspect of the present invention:

display contents of each item belonging to a hierarchical level corresponding to the one of root and node portions is an image acting as an index representing the contents of the item, at least parts of the index data function as icons; and the image displaying means displays a menu containing the item corresponding thereto when one of the icons is selected by means of the input means.

Displaying parts of the menu screen as icons in this manner makes it possible to provide an input operation that is even more convenient for the user to use.

In a fourteenth aspect of the present invention:

the image displaying means identifies and displays a selected icon and a non-selected icon.

Displaying highly recognizable icons in this manner makes it possible to provide the user with an accurate input operation.

In a fifteenth aspect of the present invention:

the image displaying means displays a display change area on a screen and switches the image which is displayed when the display change area is selected by the input means so as to display plurality of items corresponding to a leaf portion of the tree structure.

This makes it possible to switch smoothly between hierarchical menu screens.

In a sixteenth aspect of the present invention:

the image displaying means displays explanatory information for explaining details of information displayed on a display screen so as to overlay the display information with the explanatory information, and causes the explanatory information to move so that the contents of the display information in the overlaid area are recognizable.

In other words, at least part of a data transmission management screen in the terminal device of the present invention is presented as a dynamic image. When explanatory information for explaining details of information displayed on the display screen is presented as a dynamic image that overlays the information on the display screen in this manner, it is preferable that the explanatory information is made to move to ensure that the display information in the overlaid area can be seen. This makes it possible to provide an image display that is even easier for the user to understand.

BRIEF DESCRIPTION OF THE DRAWINGS

FIG. 17 is an explanatory view of the menu structure of the second embodiment;

DESCRIPTION OF PREFERRED EMBODIMENTS

Preferred embodiments of the present invention will now be described with reference to the accompanying drawings.

First Embodiment

Figure 1:
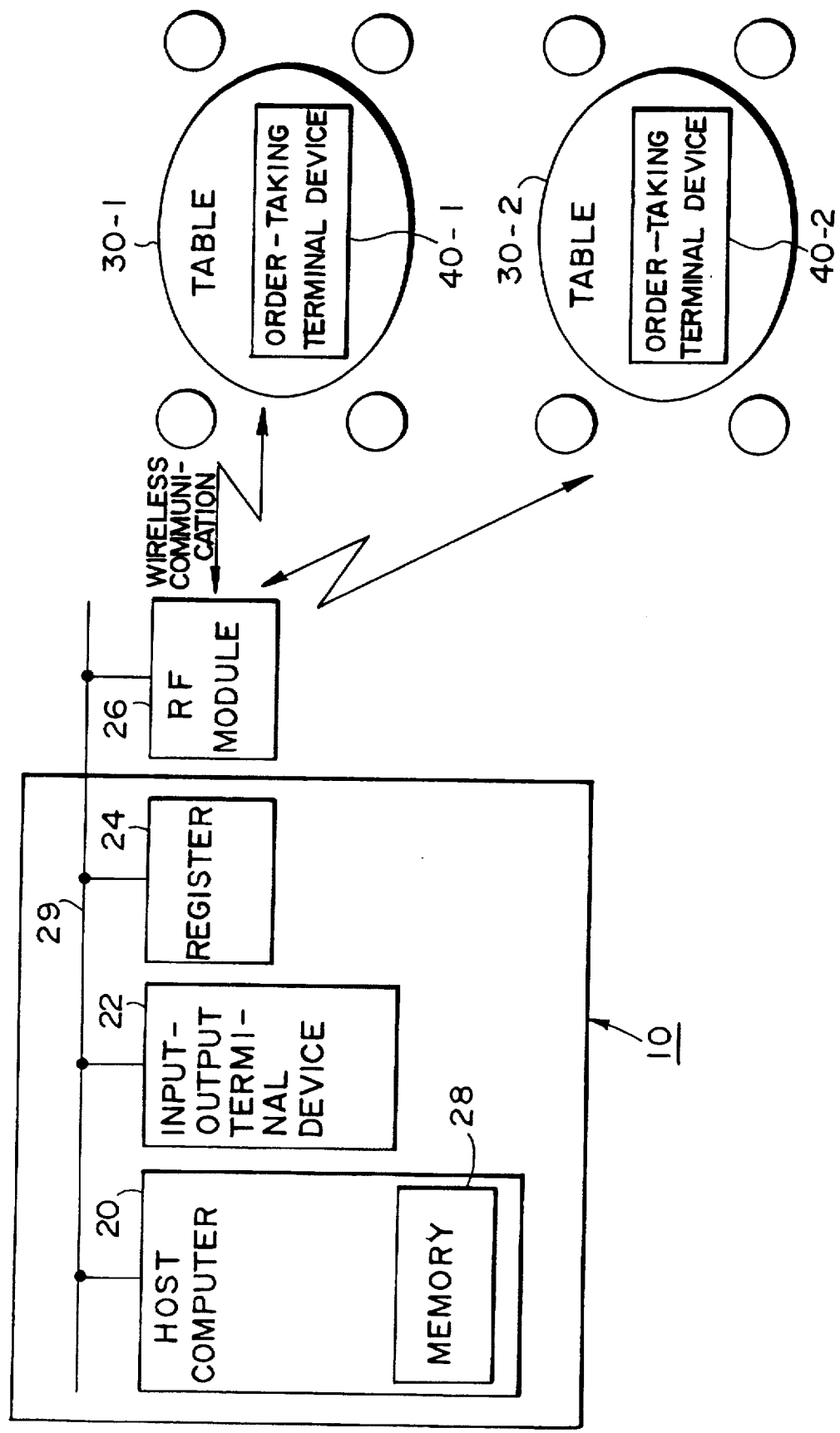
FIG. 1 is an explanatory view of the order management system of a preferred first embodiment of the present invention.

A first preferred embodiment of the present invention is shown in FIG. 1. This order management system controls orders at a restaurant located at a site such as an amusement park. Specifically, it is configured to comprise an on-site (i.e., installed at the restaurant) point-of-sales (POS) system 10 that functions as a main piece of management equipment for order management and a plurality of order-taking terminal devices 40-1, 40-2 . . . located on each of the tables 30-1, 30-2 . . . of the restaurant.

This on-site POS system 10 is connected by a line 29 to a host computer (not shown in the figure) at the head office of the restaurant chain that handles all of the restaurants. A network is configured of the head-office host computer and a host computer 20 at each restaurant.

The POS system 10 is configured to comprise the host computer 20, an input-output terminal device 22 that functions as an input-output means, and a register 24 that keeps track of all money transactions. This POS system 10 uses an RF module 26 as a relay terminal to keep in contact with the order-taking terminal devices 40-1, 40-2 . . . on the tables 30 within the restaurant.

The host computer 20 is configured to comprise a memory 28. Programs that enable the on-site host computer 20 to function as a main piece of management equipment for order management are stored in this memory 28.

In addition, an operating program and image data for order screens are stored in the memory 28 for the order-taking terminal devices 40. That is to say, this memory 28 also functions as storage means for data to be transferred to the terminal devices 40.

In this case, the operating program and image data are generated to enable order management of the food served at this restaurant.

The operating program and image data for order screens that are stored in the memory 28 for the terminal devices are read out when the system starts up, then are transferred to each of the order-taking terminal devices 40-1, 40-2 . . . via the RF module 26.

When an order is placed from one of the order-taking terminal devices 40, the on-site POS system 10 temporarily stores details of that order in the memory 28 and also outputs a printout of the order from the input-output terminal device 22. If this restaurant is a fast-food restaurant, when an order is received, details of that order are processed at the register 24 to compute the bill, then those details are output as a printout from the input-output terminal device 22.

When the ordered food has been prepared, the restaurant staff inputs notice data that the ordered food is ready to the on-site POS system 10 by means of the input-output terminal device 22. When this input is performed, the host computer 20 sends an order-ready message to the order-taking terminal device 40 on the corresponding table 30, as second data.

When an order for information is input from one of the order-taking terminal device 40, as will be described later with reference to a second embodiment of the present invention, the on-site POS system 10 temporarily stores the contents of that order in the memory 28. If the thus-ordered information is already in the memory 28, that information is transferred as second data to the appropriate order-taking terminal device 40. If the thus-ordered information is not already in the memory 28, the POS system 10 asks the head-office host computer (not shown in the figure) for the required information, and that information is transferred as second data to the appropriate order-taking terminal device 40.

Figure 2:
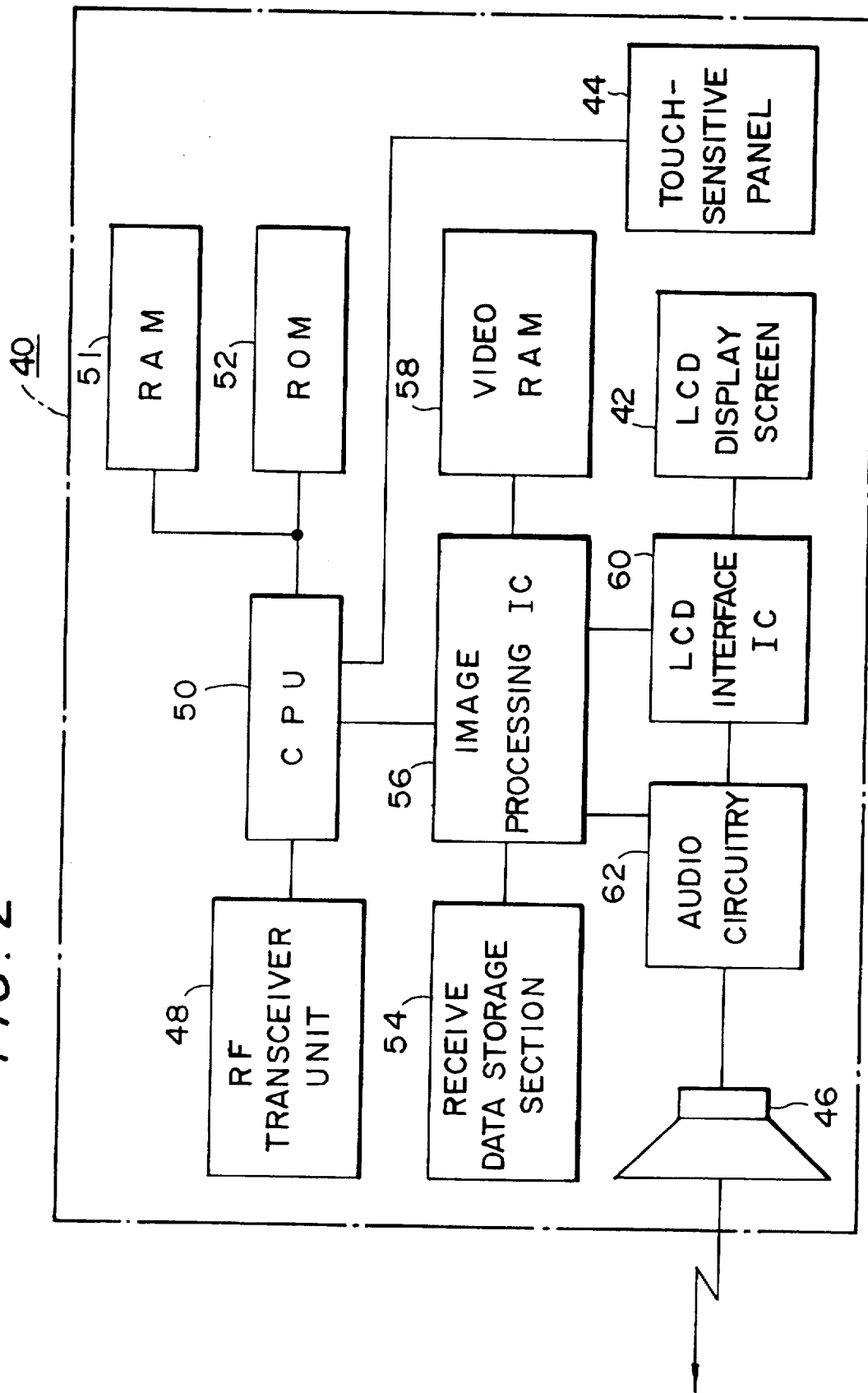
FIG. 2 is a functional block diagram showing the specific configuration of the order-taking terminal device in the system of FIG. 1.

The configuration of the order-taking terminal device 40 that is placed on each table is shown in FIG. 2. This order-taking terminal device 40 comprises a liquid crystal display screen 42 and a transparent touch-sensitive panel 44 placed on this display screen 42, and is configured in such a manner that a customer can operate the touch-sensitive panel 44 while viewing order screens displayed on the display screen 42. This order-taking terminal device 40 is also provided with a speaker 46 configured in such a manner that messages such as those relating to the operating sequence and order confirmation messages can be output audibly therefrom.

The configuration is such that the inputting of an order is facilitated by the touch-sensitive panel 44, whereby touch sensors are arranged in a predetermined mutual relationship with the products that can be ordered on the order menu screen that is displayed on the screen 42.

This order-taking terminal device 40 is configured to comprise an RF transceiver unit 48, a CPU 50, RAM 51, ROM 52, a receive data storage section 54, an image processing IC 56, and video RAM 58. The image processing IC 56 is configured to display an order screen on the display screen 42 via the LCD interface IC 60 and also to output audio signals from the speaker 46 via audio circuitry 62.

This order-taking terminal device 40 is also configured to transmit and receive data through a wireless communications circuit formed between the RF transceiver unit 48 and the RF module 26 of FIG. 1.

A basic operating program is stored as firmware in the ROM 52 to provide basic control over the entire apparatus.

This basic operating program is configured to control the entire apparatus on the basis of data such as inputs from the touch-sensitive panel 44, and also control functions such as the transfer of data to and from the POS system 10. This basic operating program also comprises a program for writing the image data and operating program received from the host computer 20 into the receive data storage section 54.

When the order-taking terminal device 40 receives the operating program and image data for order screens from the on-site POS system 10 at start-up, the CPU 50 writes the thus received operating program and image data into the receive data storage section 54 on the basis of this basic operating program. In other words, the CPU 50 functions as a data write means.

In this case, the receive data storage section 54 could be configured by using various different types of writable memory. For example, it could be configured by using graphics memory, SRAM, PSRAM, flash memory, or a hard disk, as required.

The operating program stored in the receive data storage section 54 is basically configured as programs that display this image data in accordance with predetermined rules and also send and receive data for order management.

The image data of this embodiment is configured of data for a plurality of menu screens in a hierarchical structure, with data for each of these menu screens being stored beforehand at predetermined addresses. In order to display the contents of the menus in an easy-to-understand form on the menu screens, the configuration is such that a cartoon character (a certain "Mr. Fork" 300, as will be described later) appears as a dynamic image on each screen. Data for this cartoon character information is also stored at predetermined addresses. Note that the receive data storage section 54 is used actively as a character generator. In order to enable several cartoon characters to move freely on the screen, data for a plurality of cartoon characters could be pre-stored in the storage section 54 as part of the image data.

It should also be noted that each of these menu screens and the cartoon character data comprises both written captions and audio data.

The image processing IC 56 reads out image data from the receive data storage section 54 in accordance with control commands from the CPU 50 and the operating program stored in the receive data storage section 54. It then puts together screen data for the menu screen and writes it to the video RAM 58, and also displays the screen data stored in the video RAM 58 on the screen 42, via the interface IC 60.

In other words, in the terminal device of this embodiment, the CPU 50 performs predetermined computations for control on the basis of the basic operating program and the operating program stored in the receive data storage section 54, then outputs the thus computed control codes to the image processing IC 56.

If, for example, a user doesn't input anything through the touch-sensitive panel 44, a control code representing that fact is input to the image processing IC 56. This causes the image processing IC 56 to put together a first-level menu screen from amongst the plurality of menu screens in the hierarchy and display it on the screen 42.

If the user does input something through the touch-sensitive panel 44, the CPU 50 outputs the corresponding instruction as a control configuration to the image processing IC 56. This causes the image processing IC 56 to put together image data that is stored in the receive data storage section 54 in accordance with the operating program and display it on the screen 42.

That is to say, when a user selects certain information from the touch-sensitive panel 44, the CPU 50 outputs a control signal to the image processing IC 56 on the basis of the resultant signal from the touch-sensitive panel 44. The image processing IC 56 reads out information from in the receive data storage section 54 on the control signal, and displays the thus read-out contents on the screen 42. If there is audio data available, it also outputs this audio data from the speaker 46 via the audio circuitry 62. Thus a display and audio output is performed to correspond to the order selected by the user through the touch-sensitive panel 44.

The distinctive characteristic of this embodiment lies in the manner in which an operating program and image data that is stored in the receive data storage section 54 of the order-taking terminal device 40 is sent from the on-site POS system 10 when the order management system starts up. This ensures that the order management system can respond rapidly to variations such as changes and additions to the menu.

Figure 12:
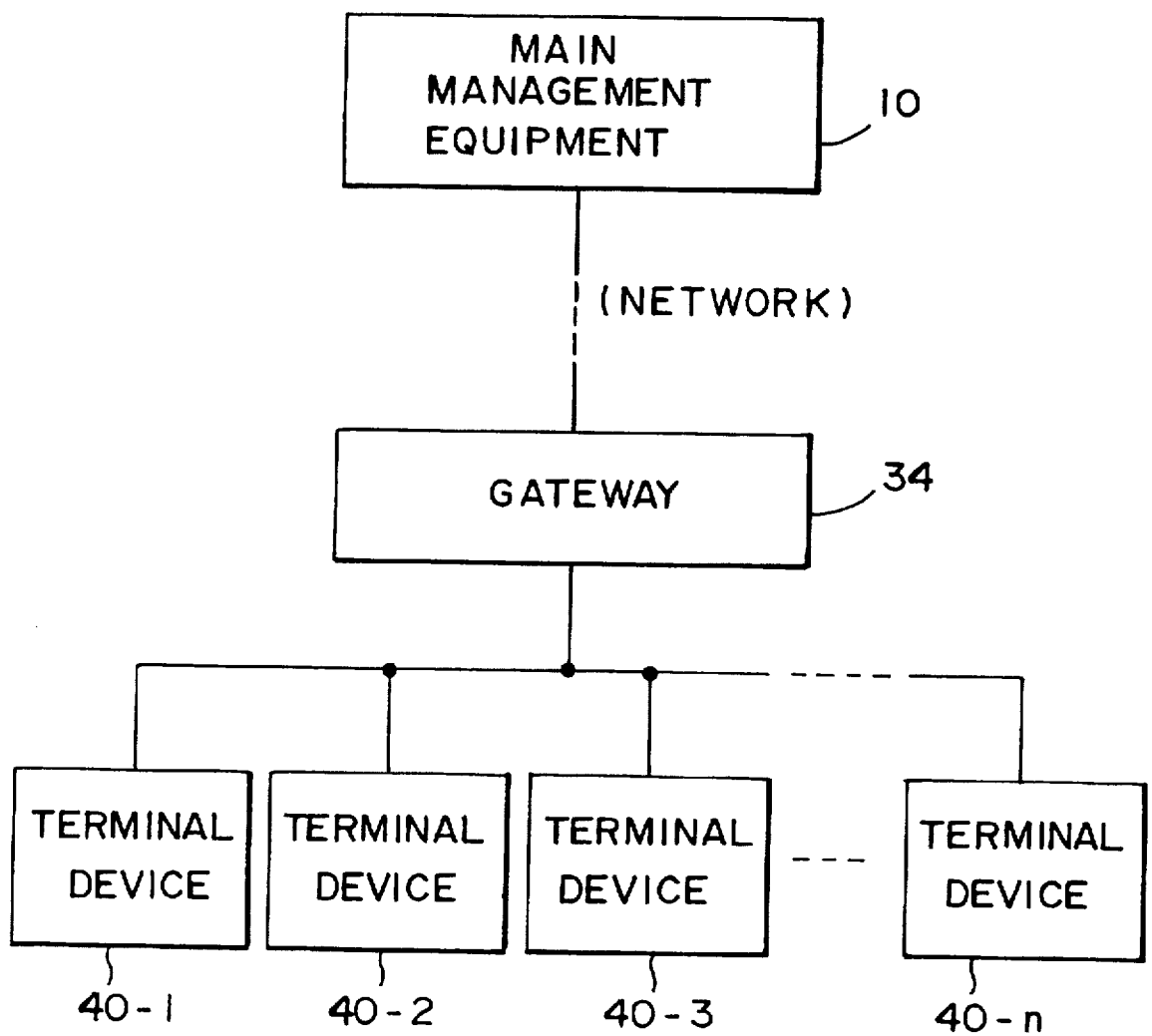
FIG. 12 is an explanatory view of the order management system of another embodiment of the present invention.

Note that, although the on-site POS system 10 that configures the main management equipment and the order-taking terminal devices 40-1, 40-2 . . . in the system shown in FIGS. 1 and 2 were described by way of example as being connected by wireless communications circuitry, other configurations could be considered such as one in which the on-site POS system 10 and the order-taking terminal devices 40-1, 40-2 . . . are connected via a gateway 34 provided on a network, as shown in FIG. 12. In such a case, this gateway 34 acts as an interface between the terminal devices 40, the network, and the main management equipment (host computer) 10.

Figure 13:
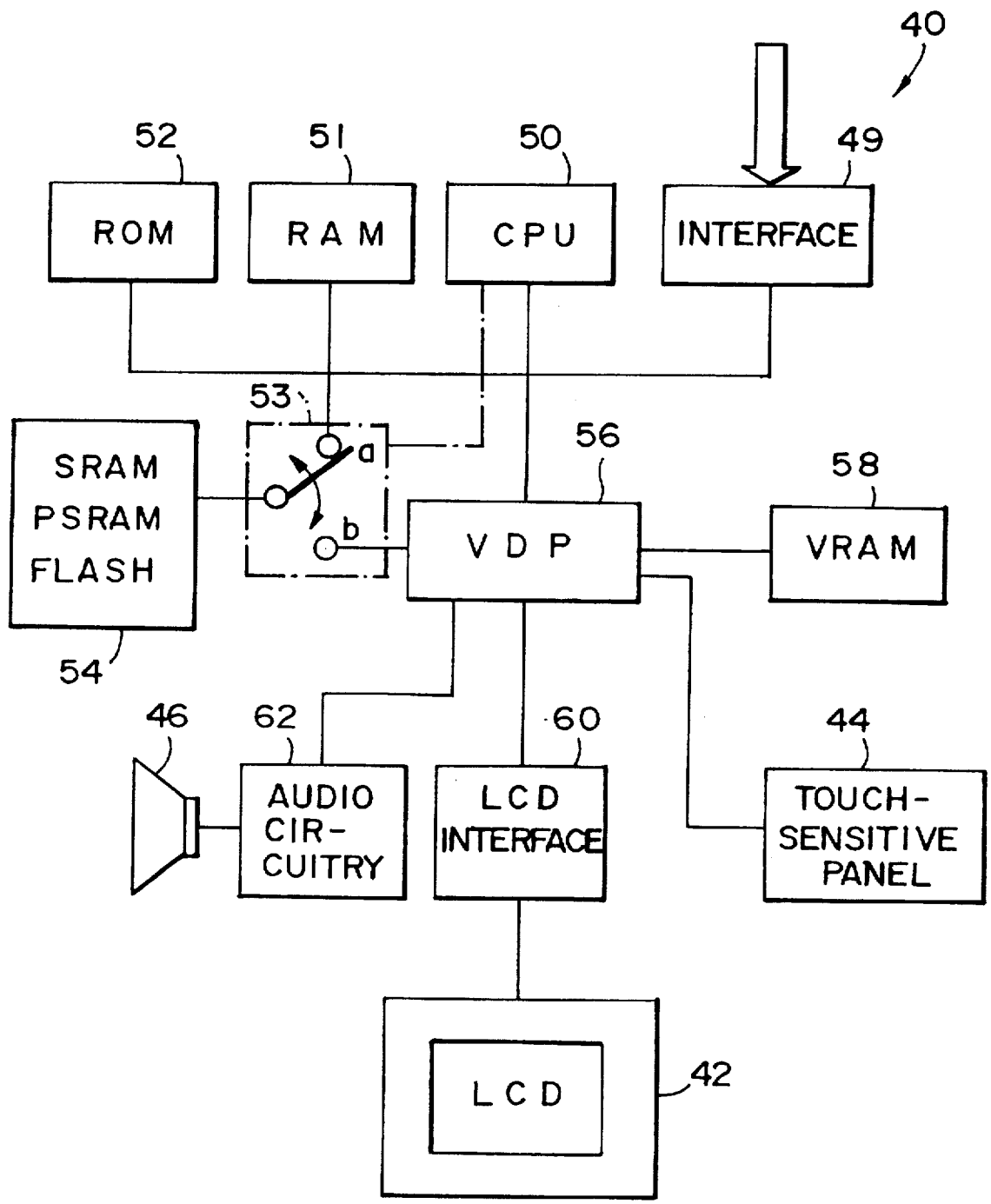
FIG. 13 is a functional block diagram of the terminal device used in the order management system of FIG. 12.

An example of a terminal device 40 used in this case is shown in FIG. 13. Note that components corresponding to those in the terminal device of FIG. 2 are given the same reference numbers and further description thereof is omitted.

As will be described later, the CPU 50 functions as a data write means. When image data and operating program that is sent from the on-site POS system 10 is received through an interface 49, a switching means 53 is controlled to a side a for a write mode and the thus received data is written to the receive data storage section 54 for storage therein.

The configuration is such that, when this write ends, the switching means 53 is controlled to switch to a side b for a read mode, and a sequence of order management actions occurs on the basis of the thus written image data and operating program.

Figure 3:
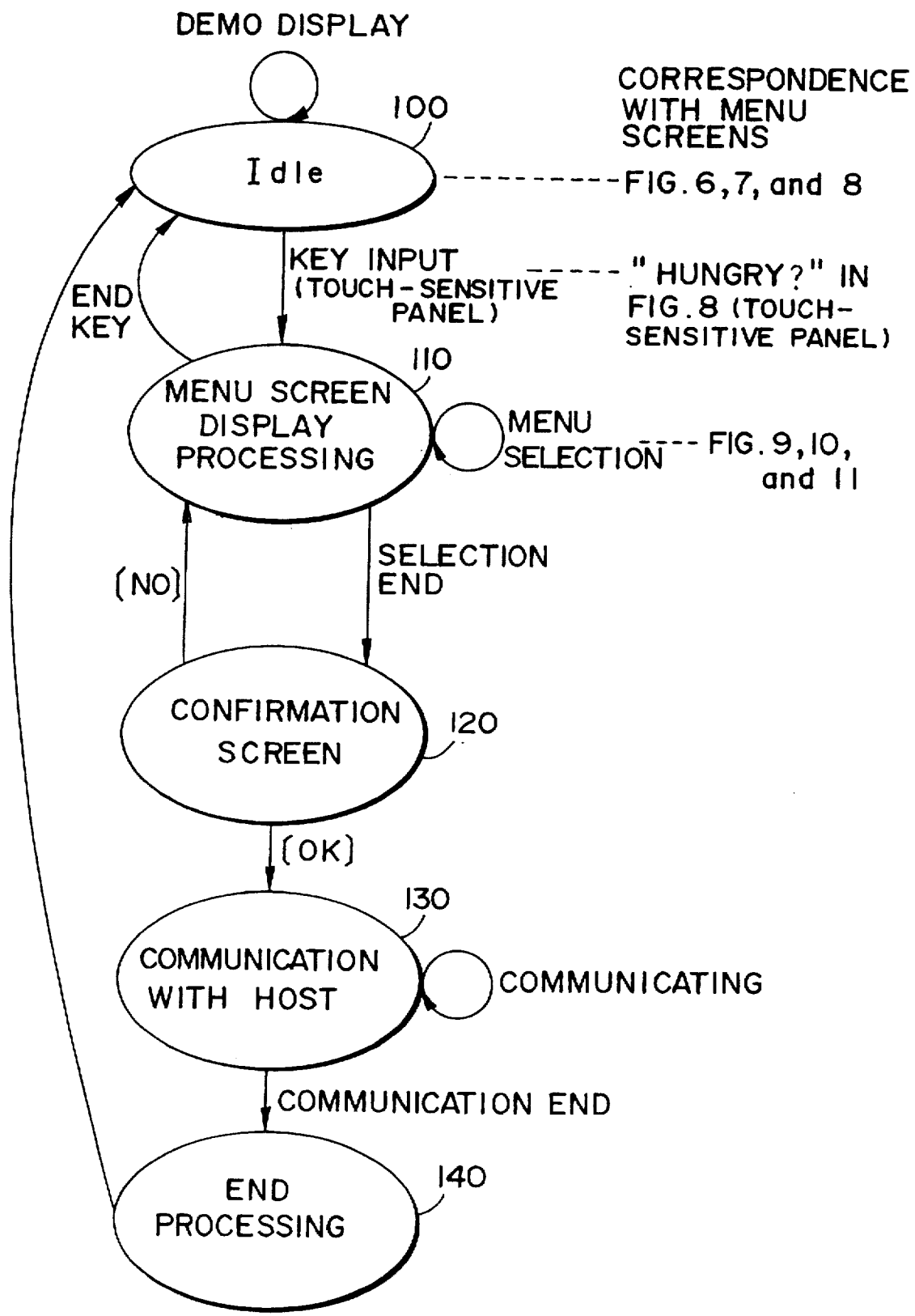
FIG. 3 is a flowchart of the operation of the order-taking terminal device.
Figure 4B:
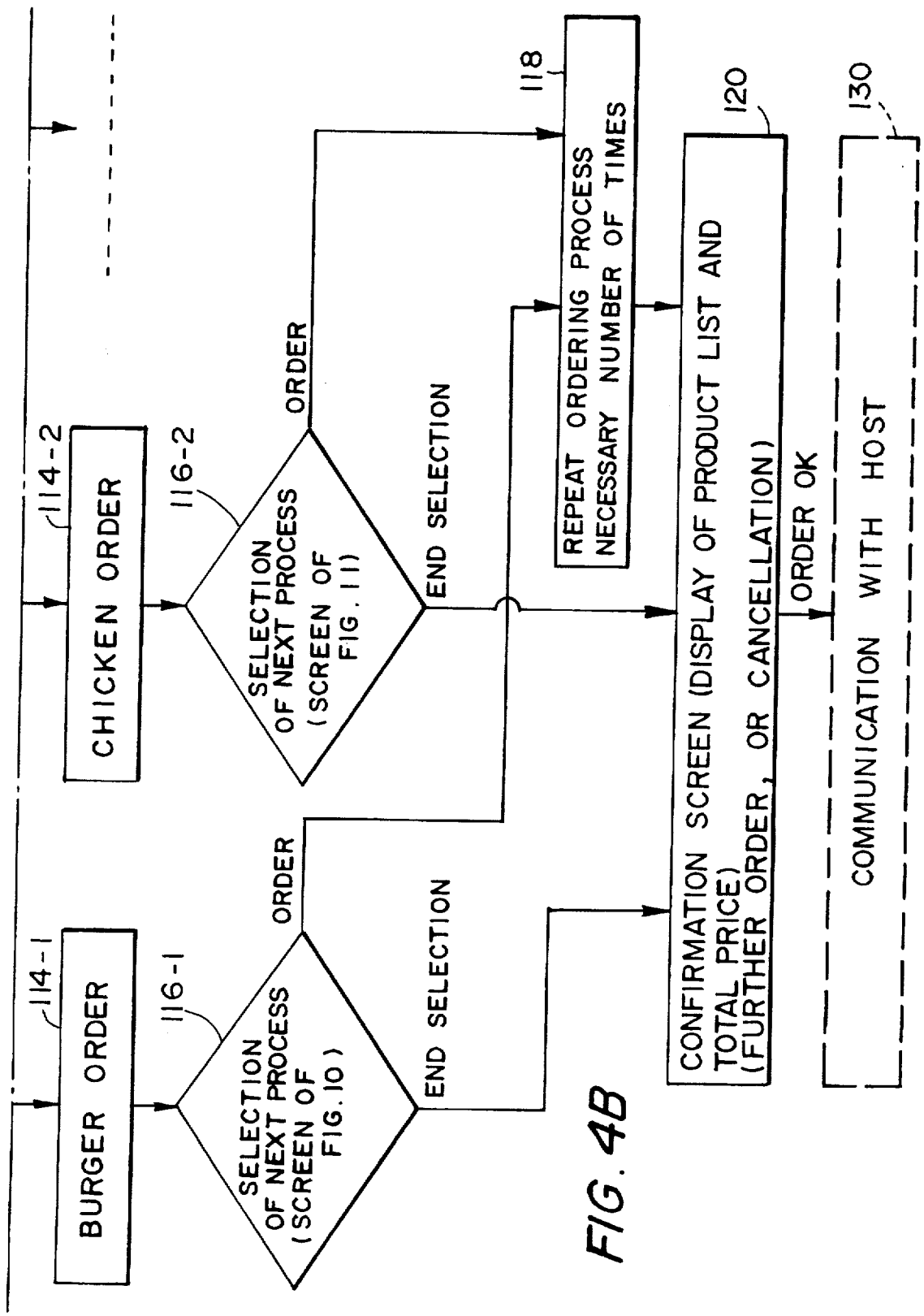
FIG. 4 is a detailed flowchart of the operation of the order-taking terminal device FIG. 4 consist of FIGS. 4A and 4B.

Flowcharts of the detailed operation of the order-taking terminal device 40 are shown in FIGS. 3 and 4. FIG. 4 consists of FIGS. 4A and 4B.

The order-taking terminal device 40 is always set to an idle state when the system starts up, as shown in FIG. 3 (step 100). During this idle state (step 100), the operation cycles through steps 102, 104, 106, and 107 shown in FIG. 4 at fixed intervals.

Figure 6:
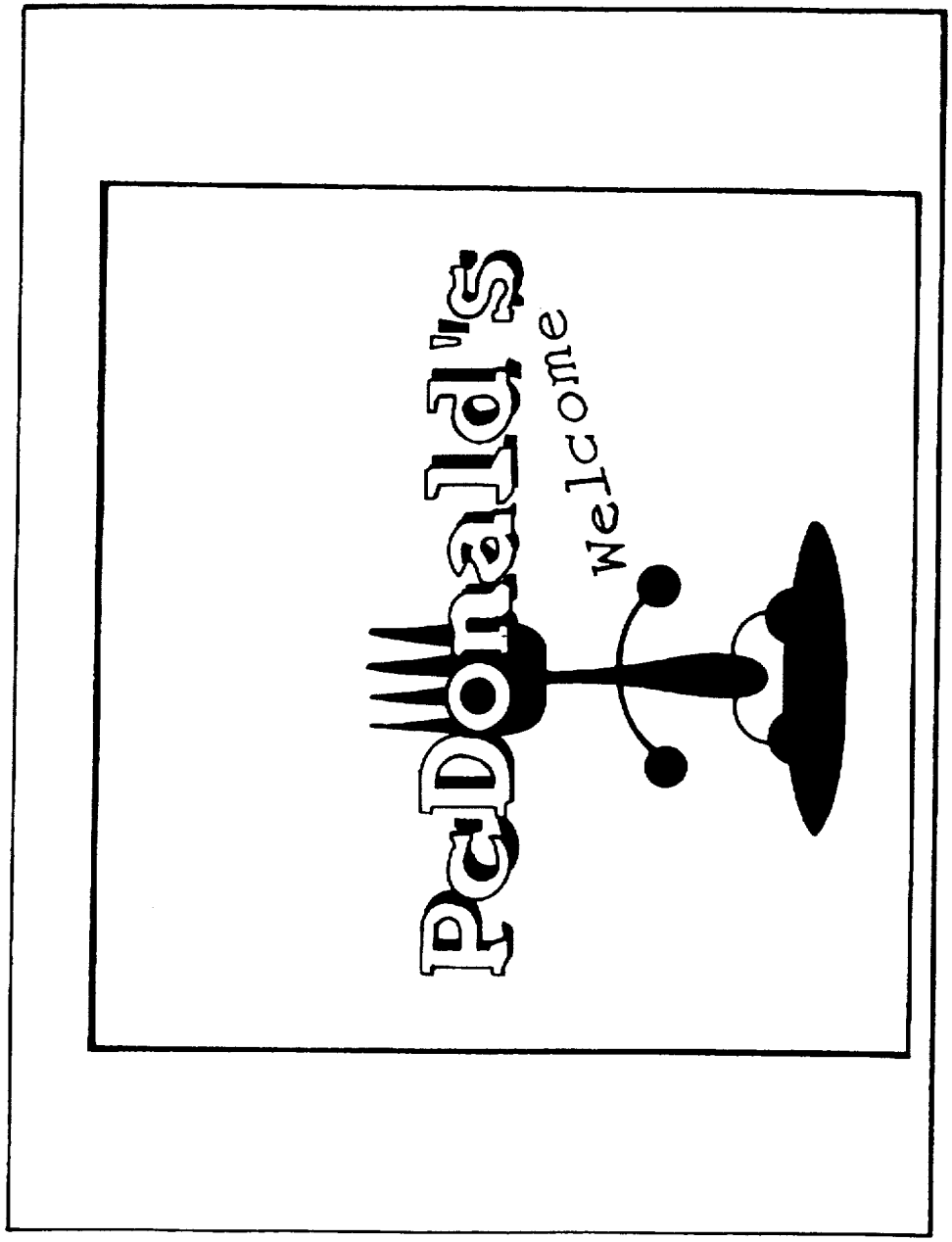
FIG. 6 is an explanatory view of the display screen of the order-taking terminal device.

In step 102, a demo screen such as that of the restaurant's logo is shown on the display screen 42 for a fixed time, as shown in FIG. 6.

Figure 7:
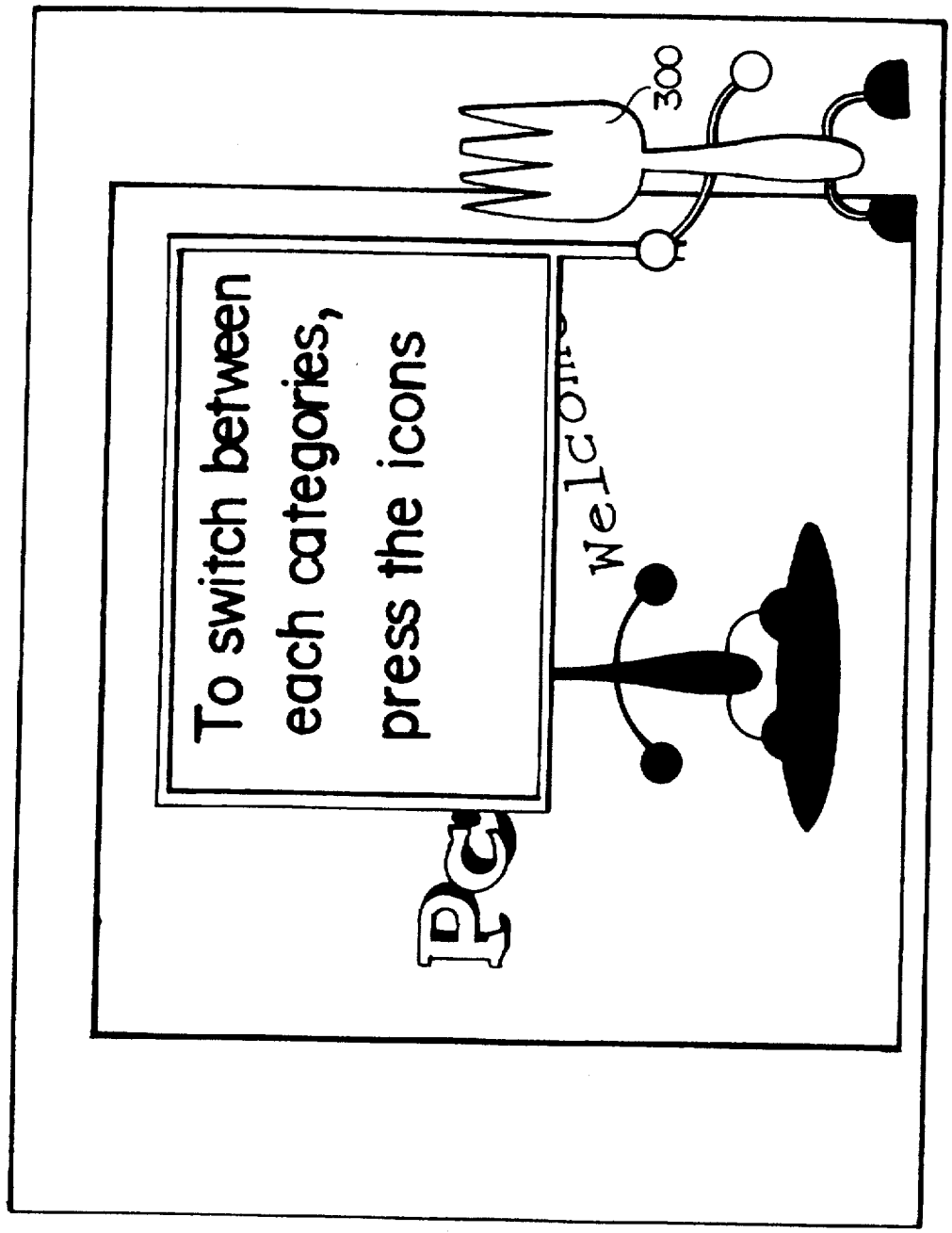
FIG. 7 is another explanatory view of the display screen of the order-taking terminal device.

In step 104, a demo screen used for explaining the functions of the system is displayed as shown in FIG. 7. At this point, a cartoon character called Mr. Fork 300 appears. This Mr. Fork 300 moves around the screen and describes the operation of the various screens both in writing and audibly.

Figure 8:
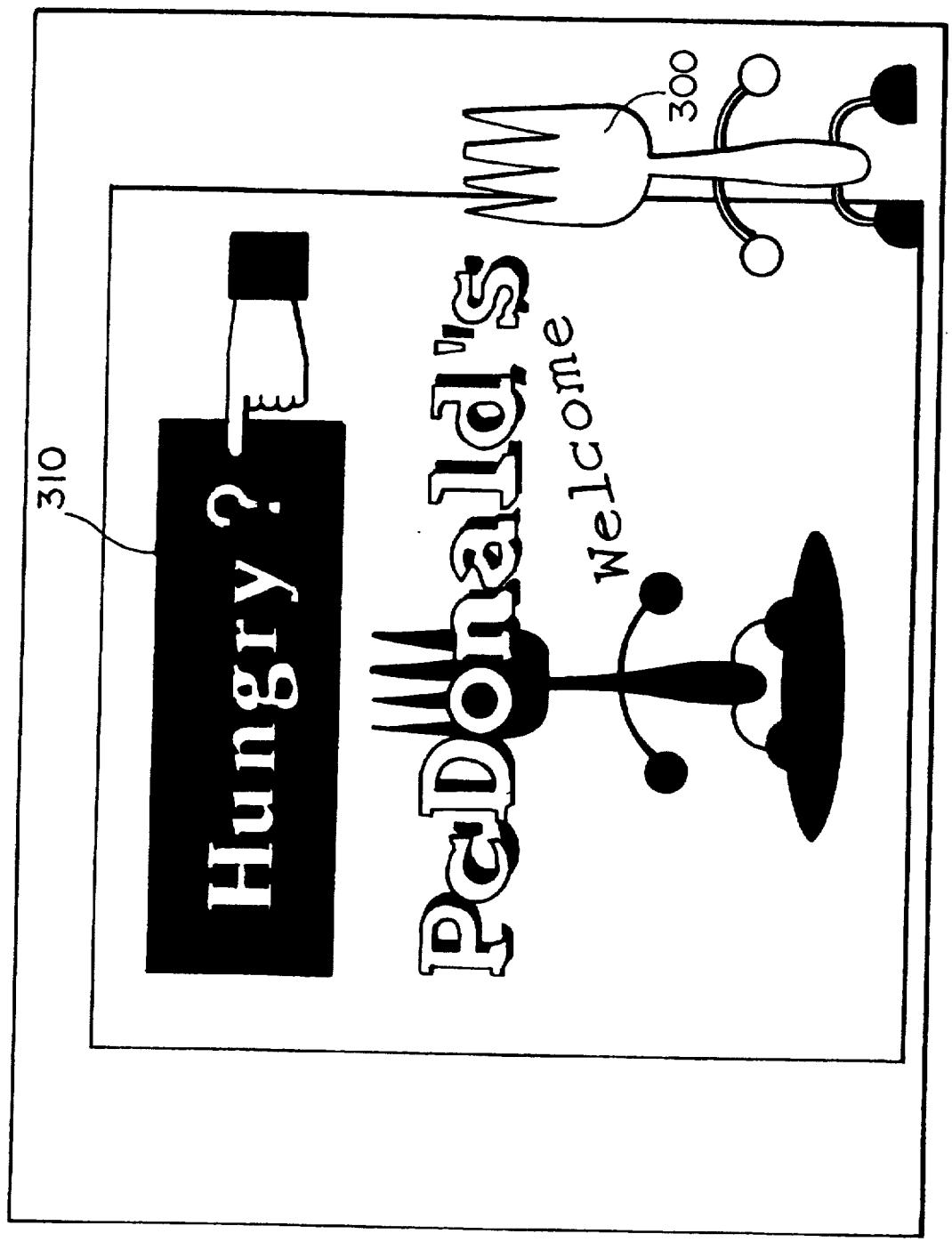
FIG. 8 is yet another explanatory view of the display screen of the order-taking terminal device.

Next, in step 106, an order-taking demo screen appears as shown in FIG. 8. Mr. Fork describes the customer to press the "Hungry?" display area (or rather, a touch sensor provided over the "Hungry?" display area) 310. If the "Hungry?" display area 310 is not pressed within a fixed time, a time-out occurs (step 107) and the sequence of steps 102 to 106 is repeated.

If the customer did touch the "Hungry?" display area 310 during step 106, the flow proceeds from the idle state of step 100 to a menu screen display processing state of a step 110. This step 110 comprises steps 112, 114, 116, and 118 of FIG. 4.

Figure 9:
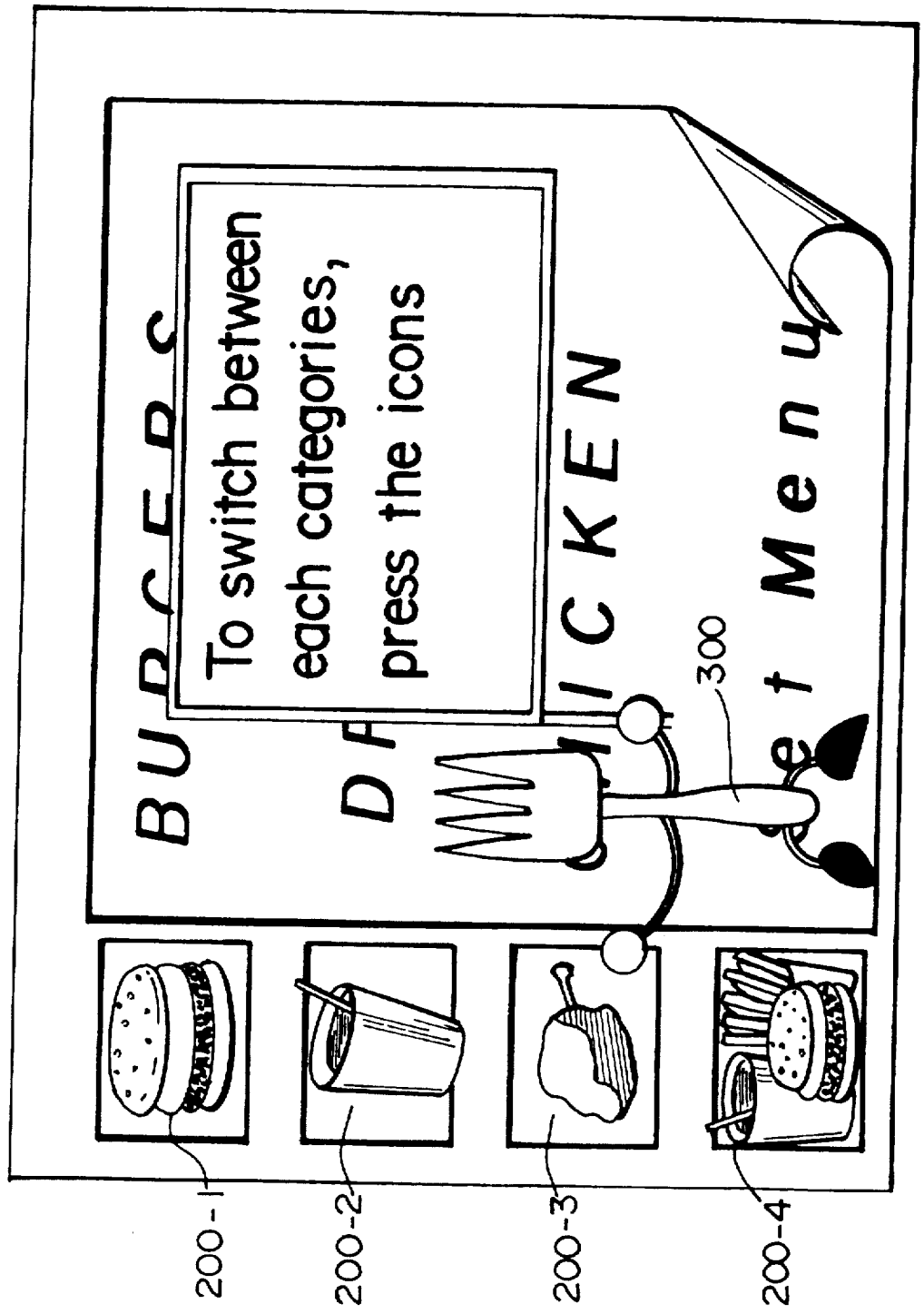
FIG. 9 is an explanatory view of the order screen of the order-taking terminal device.

First of all, in step 112, the menu screen shown in FIG. 9 appears on the display screen 42. In this menu screen, Mr. Fork 300 describes lists 200-1, 200-2, 200-3, and 200-4 of four types of food that can be ordered. If the customer presses one of the display areas of these lists 200-1 to 200-4, a selection signal for that type of food is input from a touch sensor provided over that portion (step 112).

Figure 10:
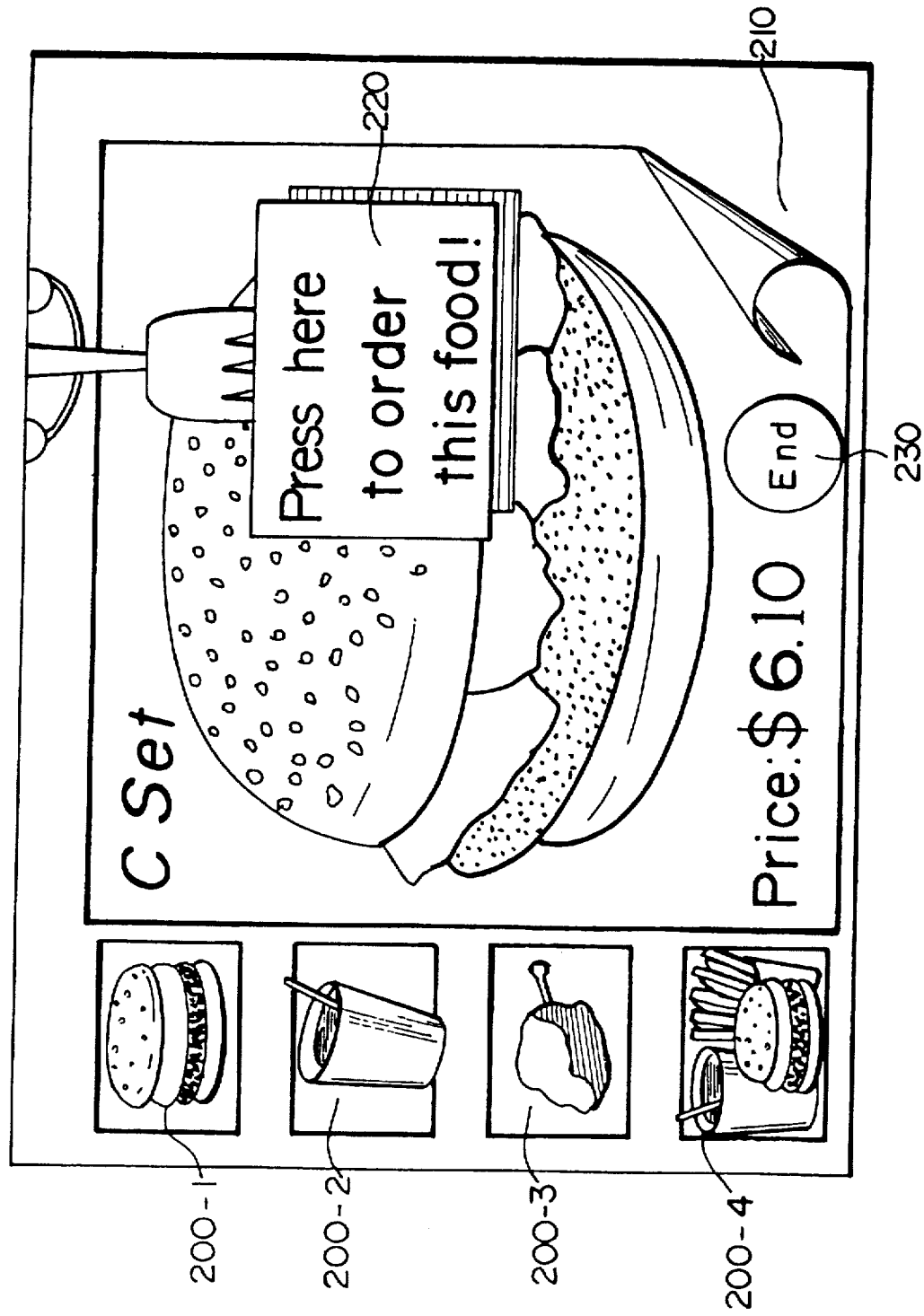
FIG. 10 is another explanatory view of the order screen of the order-taking terminal device.

Assume that the display area over the burger food list 200-1 has been touched. In that case, a menu screen for ordering burgers appears on the display screen 42, as shown in FIG. 10. Of the frames around the food display areas 200-1 to 200-4 down the left side of this screen, only the area 200-1 changes color to identify it, to indicate that the burger menu screen is currently displayed (step 114-1).

If a number of types of burger are available for ordering, a page-turning area 210 is also displayed at the bottom right corner of the screen to enable the customer to see the next burger menu screen by touching this area 210.

In each of these menu screens, a price is displayed along the bottom of the screen. When a burger appears that the customer would like to order, he or she can touch an order area 220 on the screen. This ensures that a burger selection signal corresponding to a touch sensor provided at a position over this area 220 is input to the CPU 50 (step 116-1).

Figure 11:
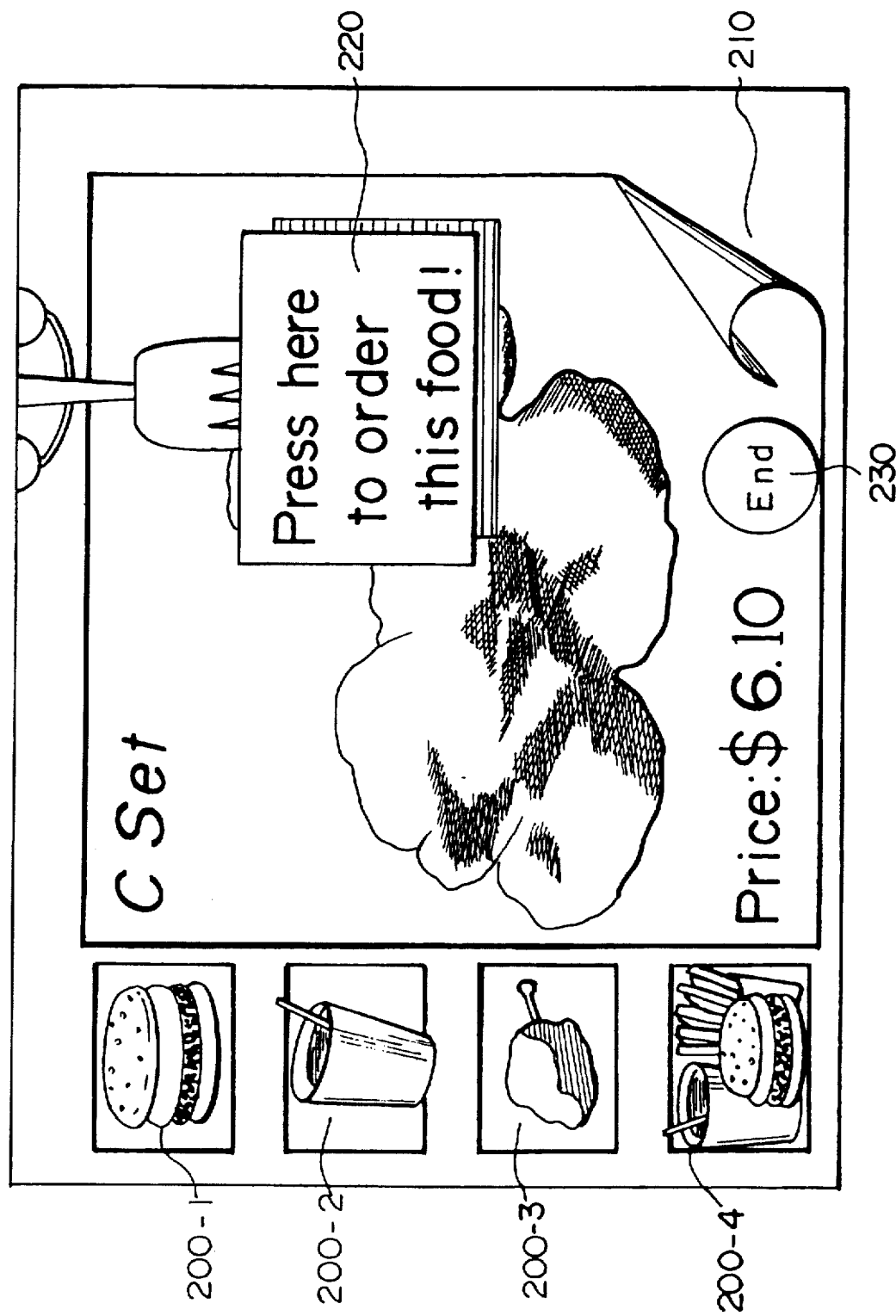
FIG. 11 is yet another explanatory view of the order screen of the order-taking terminal device.

If the customer orders chicken in step 112, the menu shown in FIG. 11 appears on the display screen 42 (step 114-2) so that the customer can selected a desired chicken dish from a number of chicken menu screens in a similar manner to that described above.

In this manner, a food such as a burger or chicken is selected and ordered. To make a further order at the same time, such as that of a beverage such as coffee or another item, the customer can touch another order area 200 on the menu screen shown in FIG. 10 or 11 to select it. This enables the customer to combine a number of orders (step 118).

Once a sequence of orders has been completed in this manner, the customer touches a computation button display area 230 that is displayed on each menu screen as shown in FIGS. 10 and 11.

This changes the flow in FIG. 3 from the menu screen display processing step 110 to a confirmation screen display step 120, and a list of the products ordered and the total bill appears on the screen together with selection buttons for additional orders, cancellation, and order-confirmation.

Once the customer has checked that this order is correct, by looking at this confirmation screen, he or she touches the order-confirmation (OK) button.

This causes the order data to be sent from this order-taking terminal device 40 via the RF transceiver unit 48 to the on-site POS system 10, where it is written to the memory 28 in the host computer 20 (step 130).

When this data transfer has ended (step 140), the order-taking terminal device 40 returns to the idle state (step 100) of FIG. 3 and starts the previously described process of inducing orders.

Figure 5:
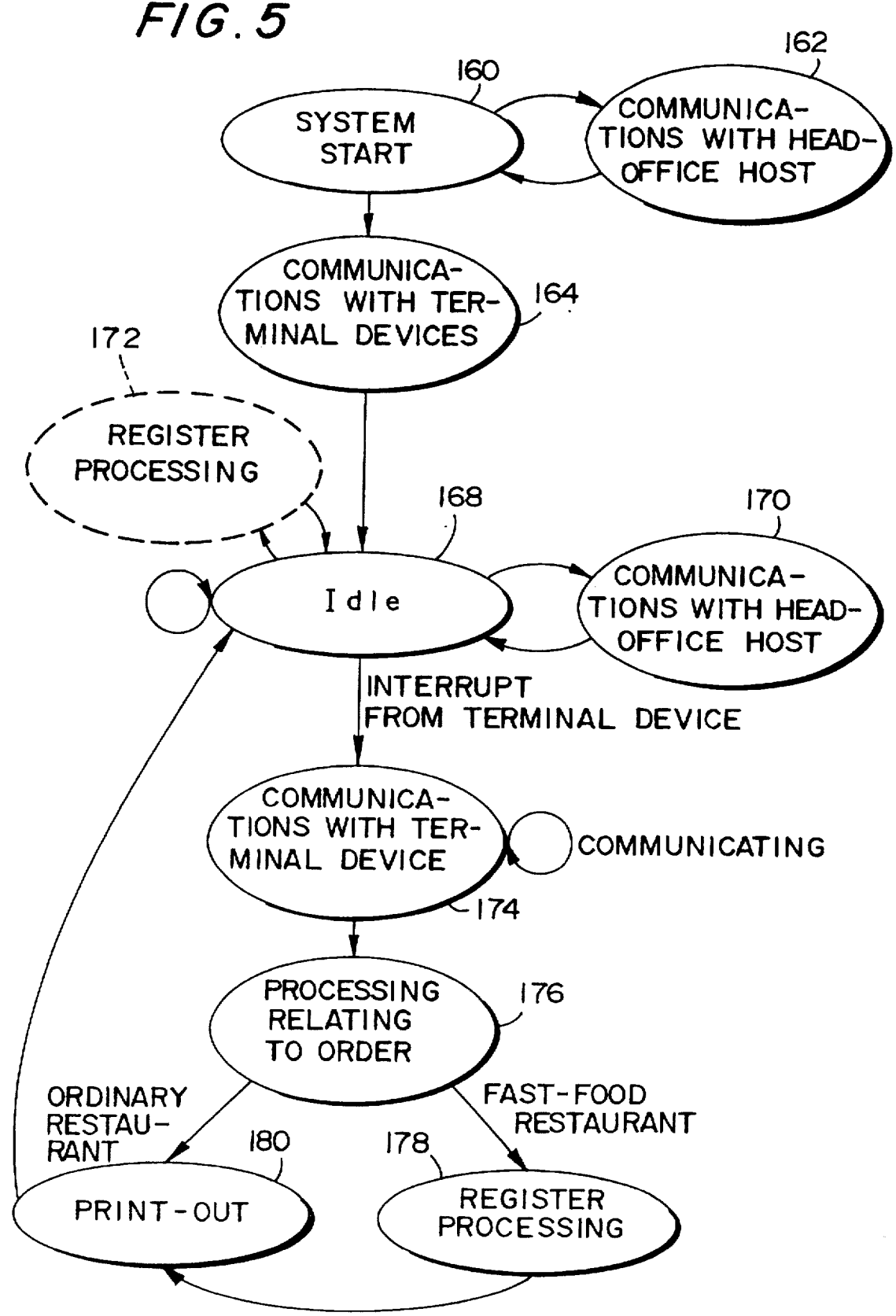
FIG. 5 is a flowchart of the operation of the on-site POS system.

A flowchart of the operations of the on-site POS system 10 is shown in FIG. 5.

When the order management system starts up (step 160), it communicates with the head-office host computer (step 162) to receive various items of data relating to the day's menu, and it also receives an operating program and image data for order screens for use by the order-taking terminal devices 40 and writes them to the memory 28 in the on-site POS system.

Subsequently, the on-site POS system 10 sets and stores the new operating program and image data in the order-taking terminal devices 40-1, 40-2 . . . on the tables 30-1, 30-2 . . . within the restaurant, by sending the operating program and image data for order screens that are stored in the memory 28 to the terminal devices 40-1, 40-2 . . . (step 164).

This enables the order management system of the present invention to respond flexibly to additions and modifications to the menu, since the operating program and image data are distributed to the order-taking terminal devices 40 as appropriate when the system starts up.

Subsequently, the on-site POS system 10 is controlled in the idle state (step 168), it can communicate with the head-office host if necessary (step 170), and it can also perform register processing such as sales management with the register 24 (step 172).

While the system is in this idle state (step 168), if order data is received from any order-taking terminal device 40 (step 174) in the manner described above, the flow proceeds to the step of processing that order (step 176). If this is a fast-food restaurant, register processing (step 178) is performed immediately after the processing of step 176, then a list of the products ordered together with the total price is printed out (step 180). If this is an ordinary restaurant, this printout is processed (step 180) after the order has been processed (step 176).

In this manner, the on-site POS system 10 is designed to accept orders from the order-taking terminal devices 40 within the restaurant and also perform the appropriate register processing.

When the products that have been ordered have been prepared, the restaurant staff use the input-output terminal device 22 to input an order-ready message, whereupon that message is sent by wireless means from the on-site POS system 10 to the appropriate order-taking terminal device 40, causing an indication to appear on the screen of that order-taking terminal device 40. This enables the customer to determine immediately that the ordered food is ready and can be picked up. Therefore, an order management system can be implemented in such a manner that both customers and staff find it extremely convenient to use, since customers can relax in their own seats during the time between the placing of each order and when the food is ready, and thus do not have to wait in line to order and pick up their food.

A particularly preferable configuration of the system of this embodiment is such that data transferred interactively between the order-taking terminal devices 40 and the on-site POS system 10 (such as ordering data sent from a terminal device 40 to the POS system 10 and message-display data sent from the POS system 10 to each of the terminal devices 40) is transferred as coded data. This makes it possible to reduce the amount of interactive data that is transferred and thus enable efficient data transfer.

The system of this embodiment also causes a cartoon character such as Mr. Fork 300 to appear within each menu screen so that information necessary to the user can be conveyed in an easy-to-understand form. In other words, the provision of this animated cartoon character makes it possible to convey to the user details such as the contents of each item in the menu screens and how to operate these menu screens, in a visually comprehensible form.

Second Embodiment

A second embodiment of the present invention will now be described in detail.

The first embodiment of the present invention was described by way of example as being applied only to the order management of a food menu in a restaurant. This second embodiment, however, is characterized in that it is configured to provide order management of information, not just of the food menu in the restaurant.

In other words, the system of this embodiment is characterized in that image data and an associated operating system for the order management of a food menu are stored in the memory 28 of the on-site POS system 10 of FIG. 1 together with image data and an associated operating system for the order management of information. When this system starts up, a plurality of sets of image data and operating programs are sent from the on-site POS system 10 to the terminal devices 40-1, 40-2 . . . , and the thus-transferred data is written into and stored in the receive data storage section 54 of each of the order-taking terminal devices 40.

Figure 15:
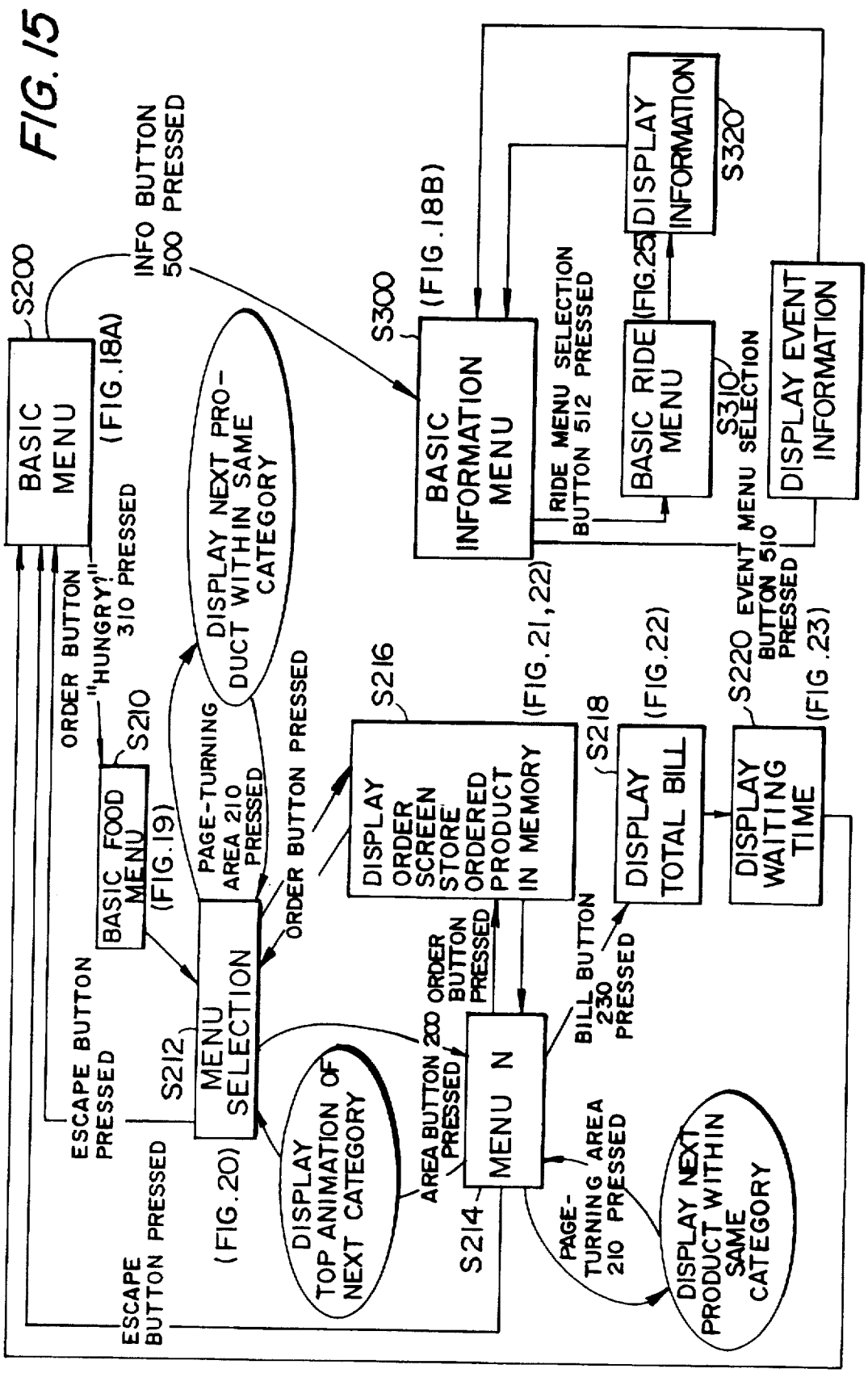
FIG. 15 is a flowchart of the operation of the order management system of the second embodiment of the present invention.

An outline of the operation of each terminal device 40 is shown in the flowchart of FIG. 15.

Figure 18A:
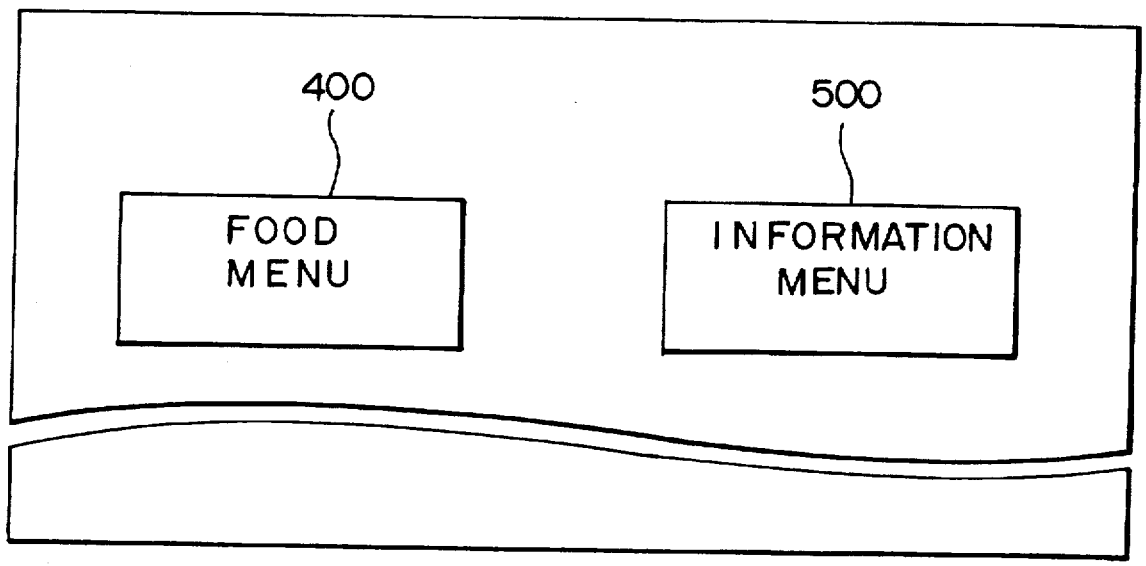
FIGS. 18A and 18B are explanatory views of a basic menu screen and a basic information menu screen of the second embodiment respectively.

First of all, when the system has started up and the transfer and writing of the image data and operating programs from the POS system 10 to the order-taking terminal devices 40-1, 40-2 . . . has ended, a basic menu screen such as that shown in FIG. 18A appears on the display screen 42 of each of the order-taking terminal devices 40 (step S200).

A food menu selection button 400 and an information menu selection button 500 are displayed on this basic menu screen, with a transparent touch-sensitive panel 44 positioned over each display area.

Figure 19:
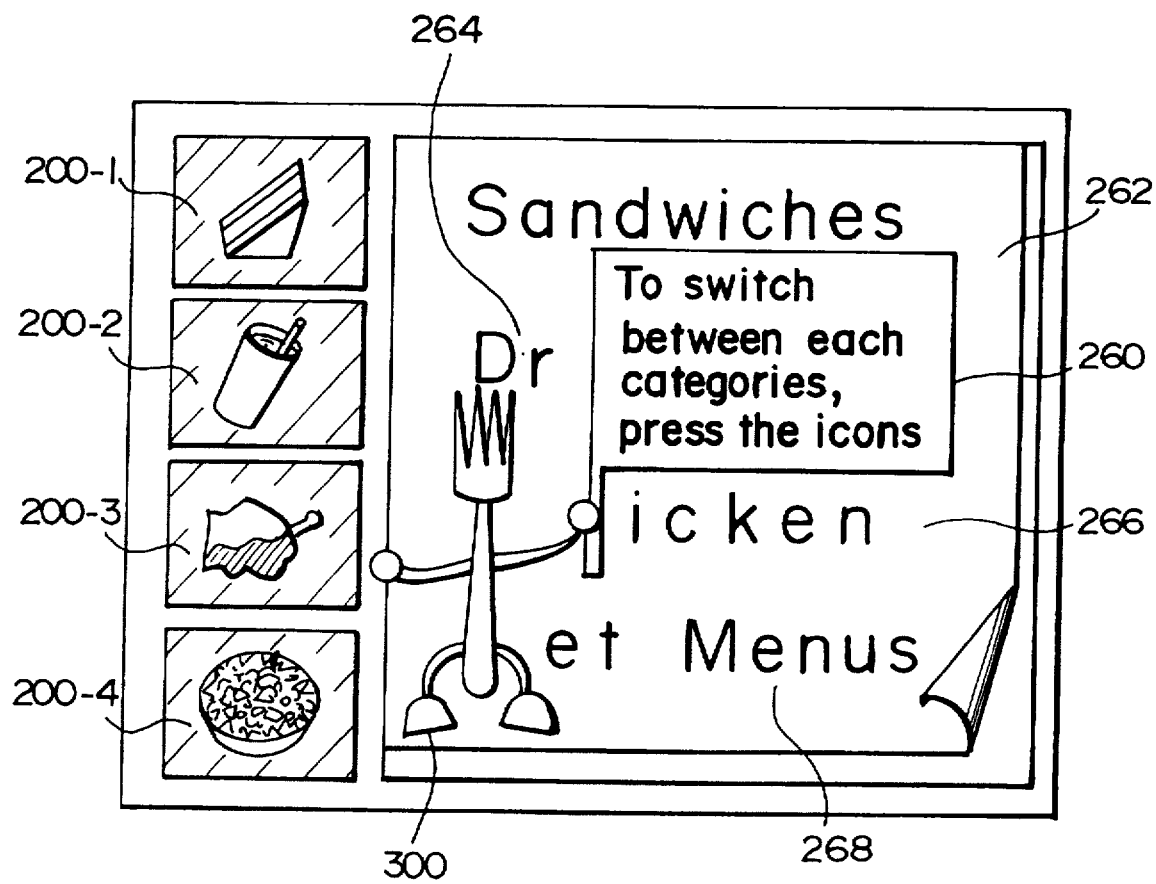
FIG. 19 is an explanatory view of a basic food menu screen.

If a customer sitting at one of the seats in the restaurant views the display screen of the terminal device 40 provided at that table and touches the food menu selection button 400 with a finger, a corresponding input signal is input to the CPU 50 from the touch-sensitive panel 44. This causes a predetermined instruction to be sent from the CPU 50 to the image processing IC 56, the image processing IC 56 calls up image data from the receive data storage section 54 on the basis of this instruction, and the basic menu screen for food is displayed as shown in FIG. 19 (step S210).

A row of major list categories 200-1 to 200-4 of products that can be ordered from the food menu is displayed on the left side of this basic menu screen. Icons are displayed as animated or photographic images in the display areas for these categories 200-1 to 200-4, to act as an instantly recognizable index to the contents of these categories (such as sandwiches, beverages, chicken dishes, and salads).

Written captions 262, 264, 266, and 268 of each of the categories are displayed beside each category in main part of the screen to the right of these categories 200-1 to 200-4. These written captions 262 to 268 are arranged in such a manner that "Sandwiches" is displayed for category 200-1, "Drinks" for category 200-2, "Chicken" for category 200-3, and "Salads" for category 200-4.

A dynamic cartoon character 300 is also displayed in such as manner as to partially overlay the written captions 262 to 268, and a sign 260 held by this cartoon character 300 bears the written notice: "To switch between each category, press the icons."

To request menus that are not currently displayed, the customer can touch the area of the sign 260 to display the next page of the menu which is a screen of the same configuration as that of FIG. 19.

It should be noted that parts of the written captions 262 to 268 that are overlaid by the cartoon character 300 and the sign 260 ("Drinks" and "Chicken" in this figure) will be obscured if the character stays in a fixed position without moving. Therefore, the cartoon character 300 and the sign 260 are made to move in a circuit up and down the screen, to made hidden captions visible. This enables efficient use of a limited display area.

From consideration of the size of the display screen and size of area that a user can be expected to touch easily, it is preferable to display about four items per screen as the major categories 200-1 to 200-4 of the food menu. Each of these categories 200-1 to 200-4 also functions as an icon, and information relating to a category is displayed on the screen when the user touches the associated icon.

Figure 20:
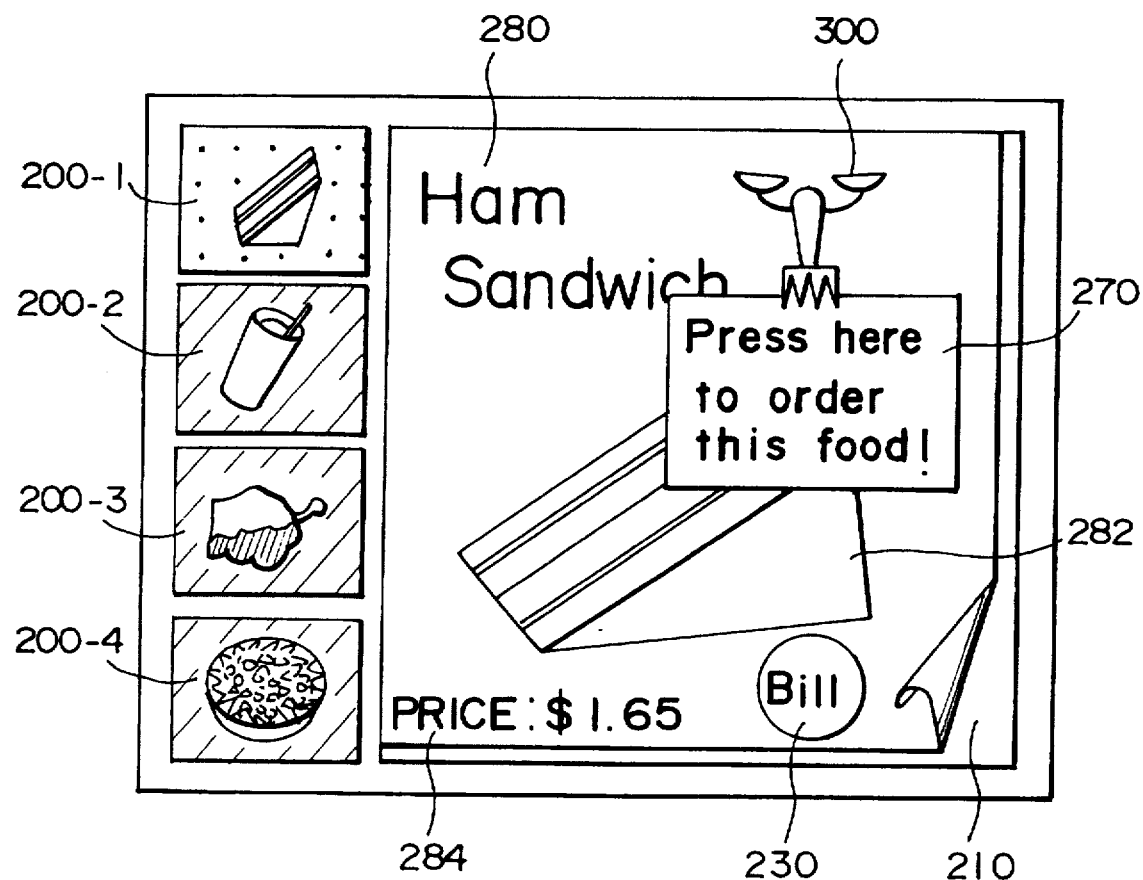
FIG. 20 is an explanatory view of a menu selection screen.

For example, if the user touches the sandwich category 200-1, a menu screen similar to that of FIG. 20 is displayed.

Note that the category 200-1 that is currently selected is displayed with a different background color within its frame, to distinguish it from the other categories 200-2 to 200-4.

More specifically, all of the categories 200-1 to 200-4 have the same background color (represented by hatching in this figure) before any selection is made (the state shown in FIG. 19). However, if category 200-1 is touched, the color of that category 200-1 changes (represented by a dotted pattern in FIG. 20) while the color of the other categories 200-2 to 200-4 remain the same. This process of having a different color within the frame of a specified category can equally well be reversed so that the selected category 200-1 remains the same color, but the color of the other categories 200-2 to 200-4 is changed.

Note that FIG. 20 shows the display that appears when the sandwich category 200-1 is specified, in which case an animated image 282 of a ham sandwich that is representative of the selected category 200-1 is displayed in the area to the right of the figure. At the same time, a written caption 280 giving the product name "Ham Sandwich" and another written caption 284 giving the price are also displayed in addition to the animated image 282 of the ham sandwich. The cartoon character 300 is also displayed on this screen, together with a sign 270 on which is written "Press here to order this food." A computation button 230 on which is written "Bill" is also displayed on the screen, to prompt computation of the bill. If the user wishes to order, he or she touches the area of the sign 270 and then touches the computation button 230.

The menu structure of these categories 200-1 to 200-4 is shown in FIG. 17. Taking the sandwich menu as an example, the configuration is such that there are three menu screens, one for each of three different types of sandwich. The first menu screen could display a salad sandwich; the second menu screen, a ham sandwich; and the third menu screen, an egg sandwich, for example. Similarly, a number of menu screens are configured to display details of each of a number of different choices in the other categories, such as drinks, chicken dishes, and salads.

If the sandwich category 200-1 has been selected and the user then touches the sign 270 shown in FIG. 20, a display screen for selecting a number of orders (not shown in these figures) appears so that the user can input a number of orders while viewing this screen. More specifically, if the user presses the specified portion 270 in accordance with the instruction "Press here to order this food," the written caption "Press here to order this food" within the sign 270 could change to show numeric keys 0 to 9 that the customer could use to input a number of orders.

Figure 21:
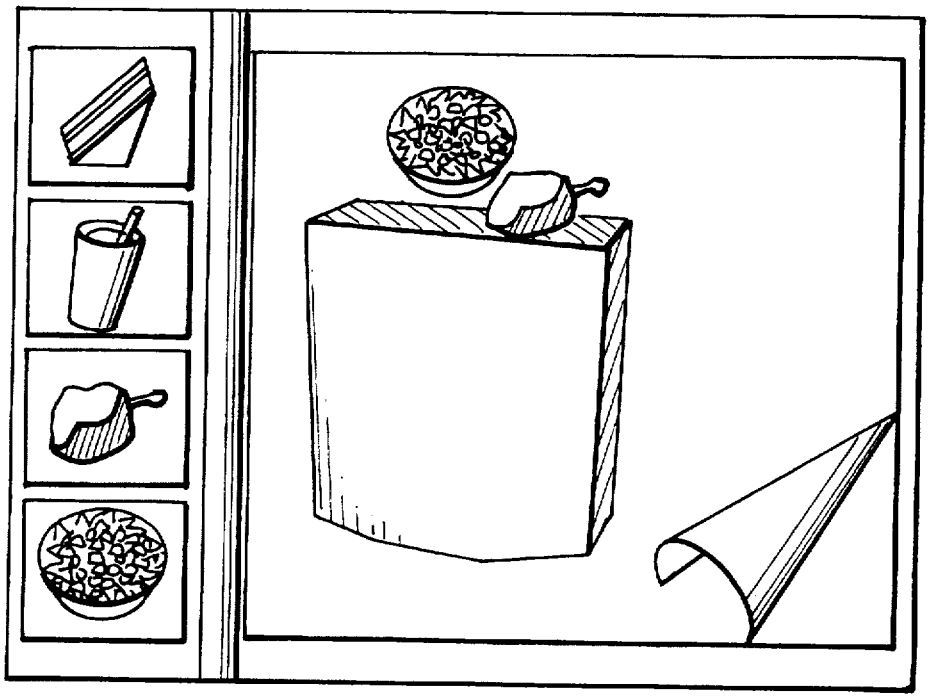
FIG. 21 is an explanatory view of an order screen.
Figure 22:
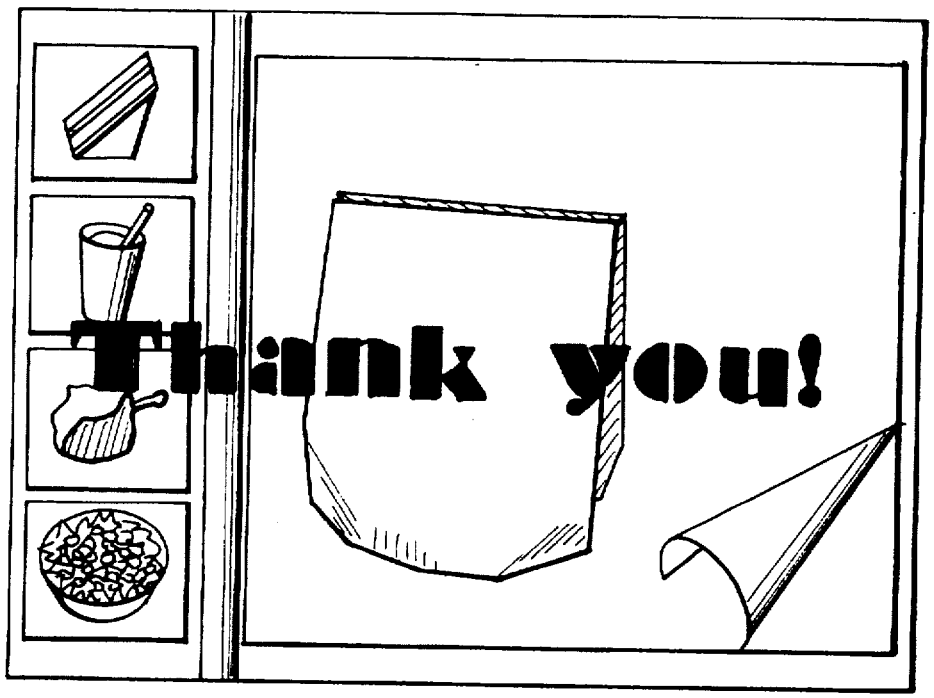
FIG. 22 is another explanatory view of an order screen.

If the customer uses this function to order a predetermined number of ham sandwiches, for example, a series of animations could appear to show the products that have been ordered in a package to go, as shown in FIGS. 21 and 22 (step S216). This enables the user to verify the details of the order visually.

At the point at which the products that have been ordered are shown accommodated within a package, as shown in FIG. 22, a "Thank you" message appears on the screen, then the display returns to the menu selection screen of FIG. 20 (steps S212 and 214).

A user that does not want a ham sandwich could press the page-turning area 210 provided at the bottom right corner of the display screen, whereupon an animated image of a salad sandwich, for example, is displayed instead of the currently displayed ham sandwich. If the page-turning area 210 is pressed again while the salad sandwich is being displayed, another type of sandwich is displayed in sequence, such as an egg sandwich.

In a similar manner, if the category 200-2 was selected, an animated image of a beverage such as orange juice appears first, together with an appropriate written caption, (step S214). If the user doesn't want orange juice and presses the page-turning area 210 provided at the bottom right of the display screen, an animated image of a different type of juice is displayed as second information. Pressing the page-turning area 210 again when this image is displayed causes the next beverage to be displayed, and thus a number of beverages can be displayed one-by-one in sequence.

Figure 23A:
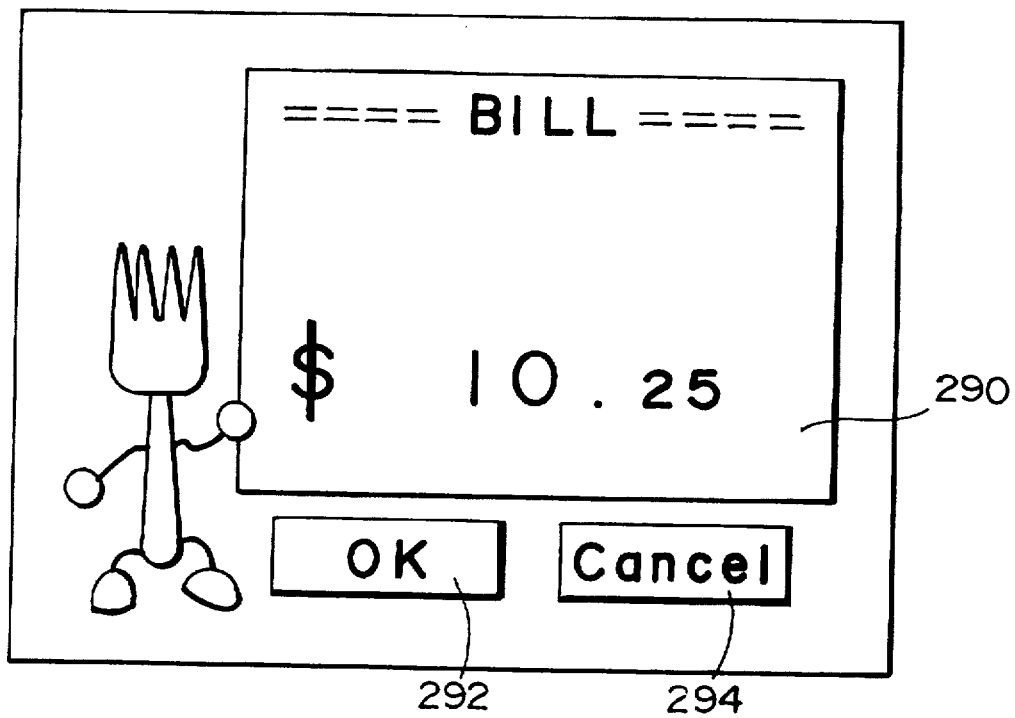
FIGS. 23A and 23B are explanatory views of a total charge screen and waiting time display screen respectively.

In this way, the user orders the desired items of food (steps S212, S214, and S216). Once this sequence of orders is completed, the user touches the computation button 230 that is displayed in a manner such as that shown in FIG. 20. This causes a total charge screen such as that shown in FIG. 23A to appear on the display screen 42 (step S218). A written caption 290 indicating the total bill for the products that the user has ordered, an OK button 292, and a cancel button 294 are displayed on this final-total screen. The user then touches the OK button 292 to agree to the bill for this order, or the cancel button 294 to correct the order.

Figure 23B:
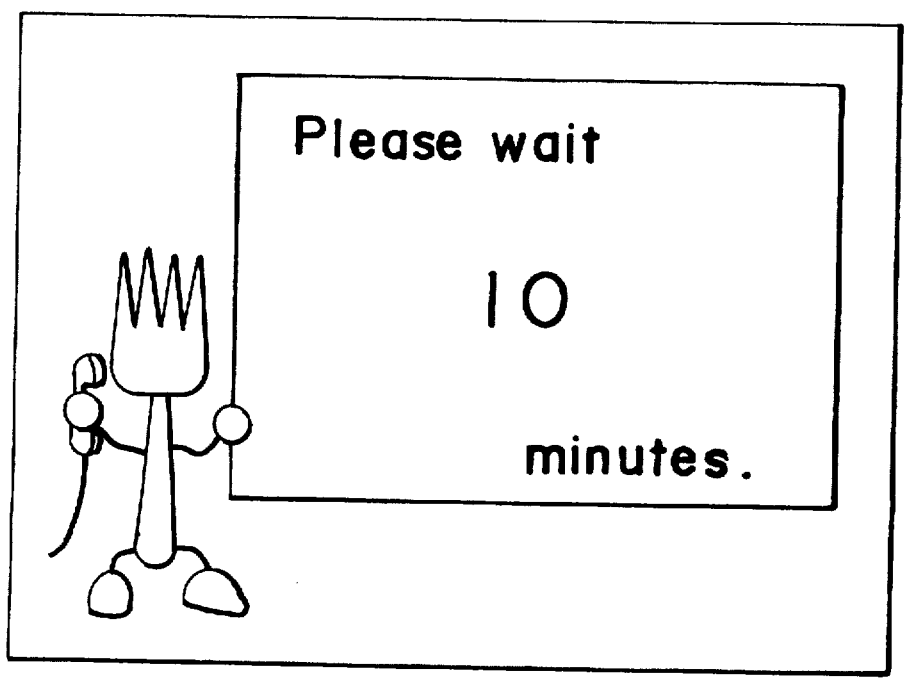

If the OK button 292 is touched, the ordering sequence ends and details of the order (information such as the food name, number of items, total bill, and table number) are sent as code data from the terminal device 40 to the host computer 20 of the POS system 10. The waiting time required until the ordered products will be ready is sent back to that terminal device 40 from the host computer 20 as code data. The time until the ordered food is ready is displayed on the display screen 42 of the terminal device 40 as shown in FIG. 23B (step S220).

When this sequence of processing ends, the flow returns to step S200 and the basic menu screen reappears on the display.

Figure 16:
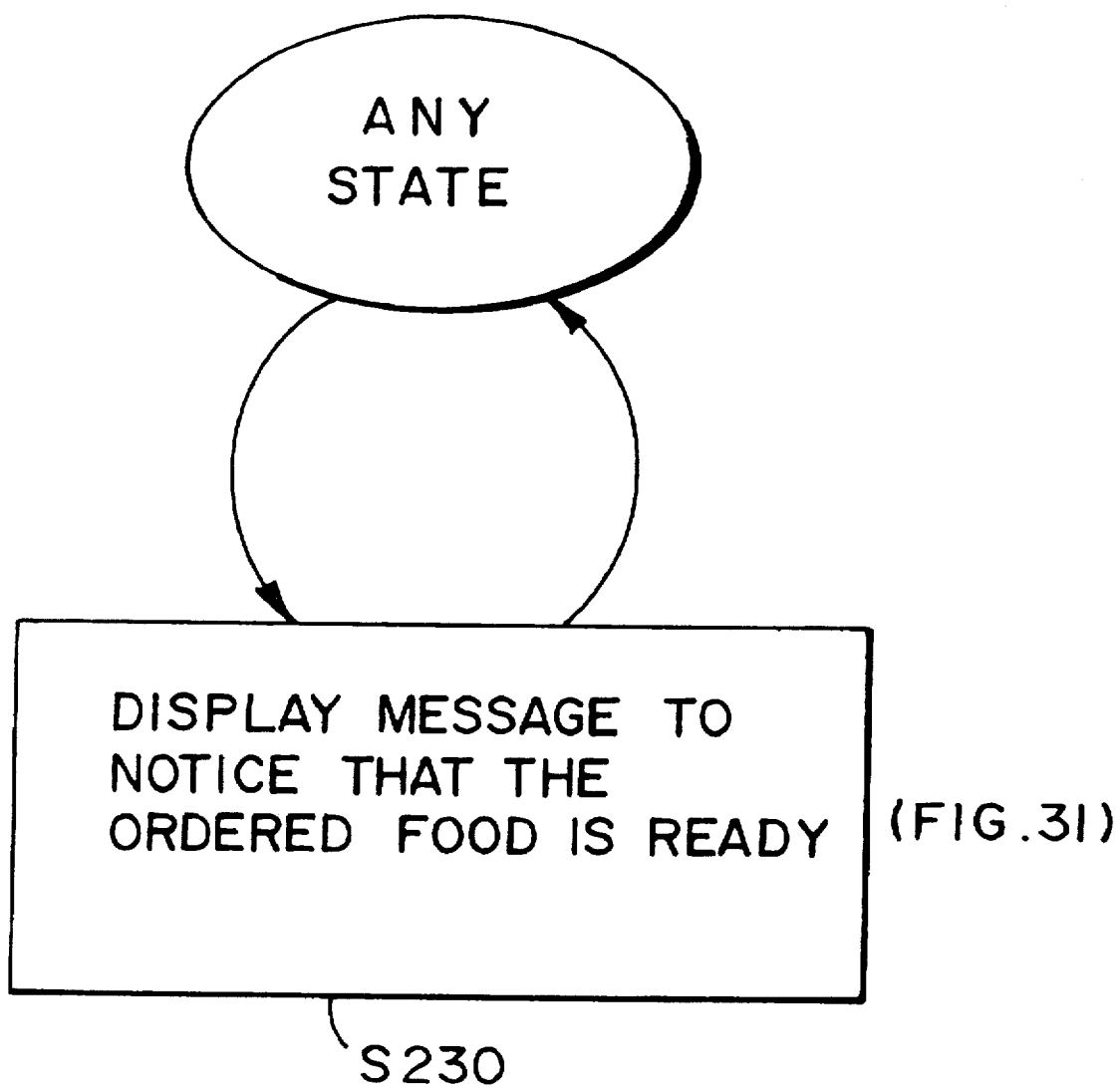
FIG. 16 is another flowchart of the operation of the second embodiment.
Figure 24:
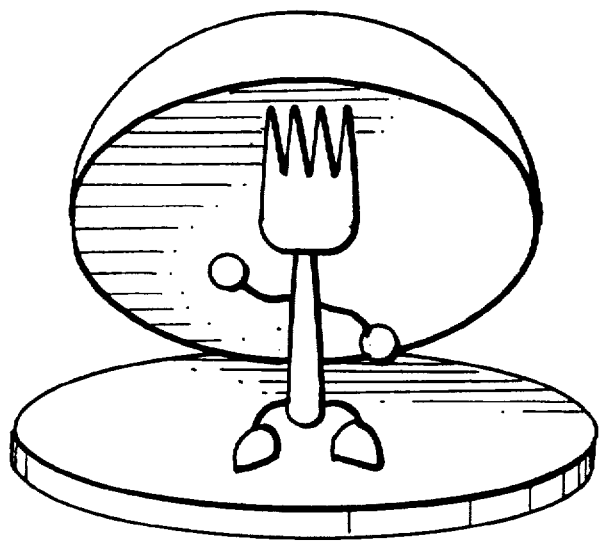
FIG. 24 is an explanatory view of an order-ready message screen.

When the food that the user has ordered is ready, an interrupt is sent from the on-site POS system 10 to the user's order-taking terminal device 40, as shown in FIG. 16, and a message saying that the ordered food is ready is sent as code data. When it receives this code data, the terminal device 40 displays a food-ready message such as that of FIG. 24 on the display screen 42 (step S230). This sends an interrupt to the display screen 42 to display a food-ready message, making it possible for the user to be informed accurately that the ordered food is ready, even if the user has selected another screen and the associated operations are being performed, as will be described later.

Note that if the cancel button 294 is touched in step S218, the menu selection screen of FIG. 19 returns to the screen, enabling the user to start the ordering process from the beginning.

Note also that the system of this embodiment is configured in such a manner that, once the ordering from the food menu has ended, the waiting time required until the food is ready can be used to present various items of information about the amusement park, from the basic menu screen displayed on the display screen 42 (step S200). To see this information in such a case, the user touches an information menu selection button 500 from the basic menu screen shown in FIG. 18A.

Figure 18B:
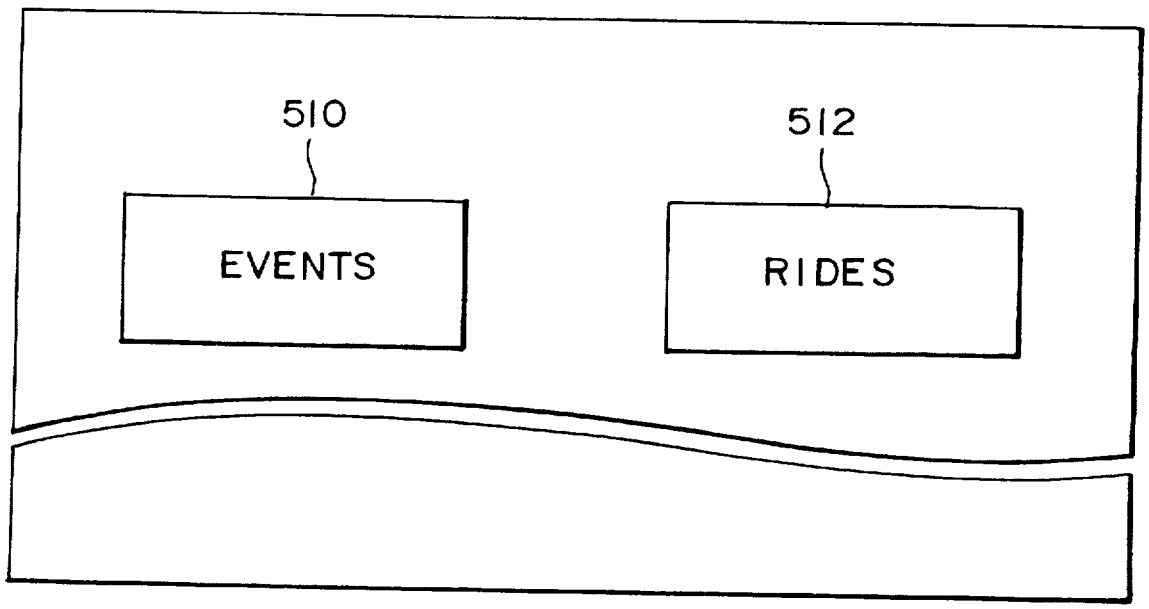

This causes a basic information menu screen to appear on the display screen 42, as shown in FIG. 18B, and also causes aural instructions for operating this basic menu screen to be output from the speaker 46 (step S300).

An event menu selection button 510 and a ride menu selection button 512 are displayed on this basic menu screen.

Figure 25:
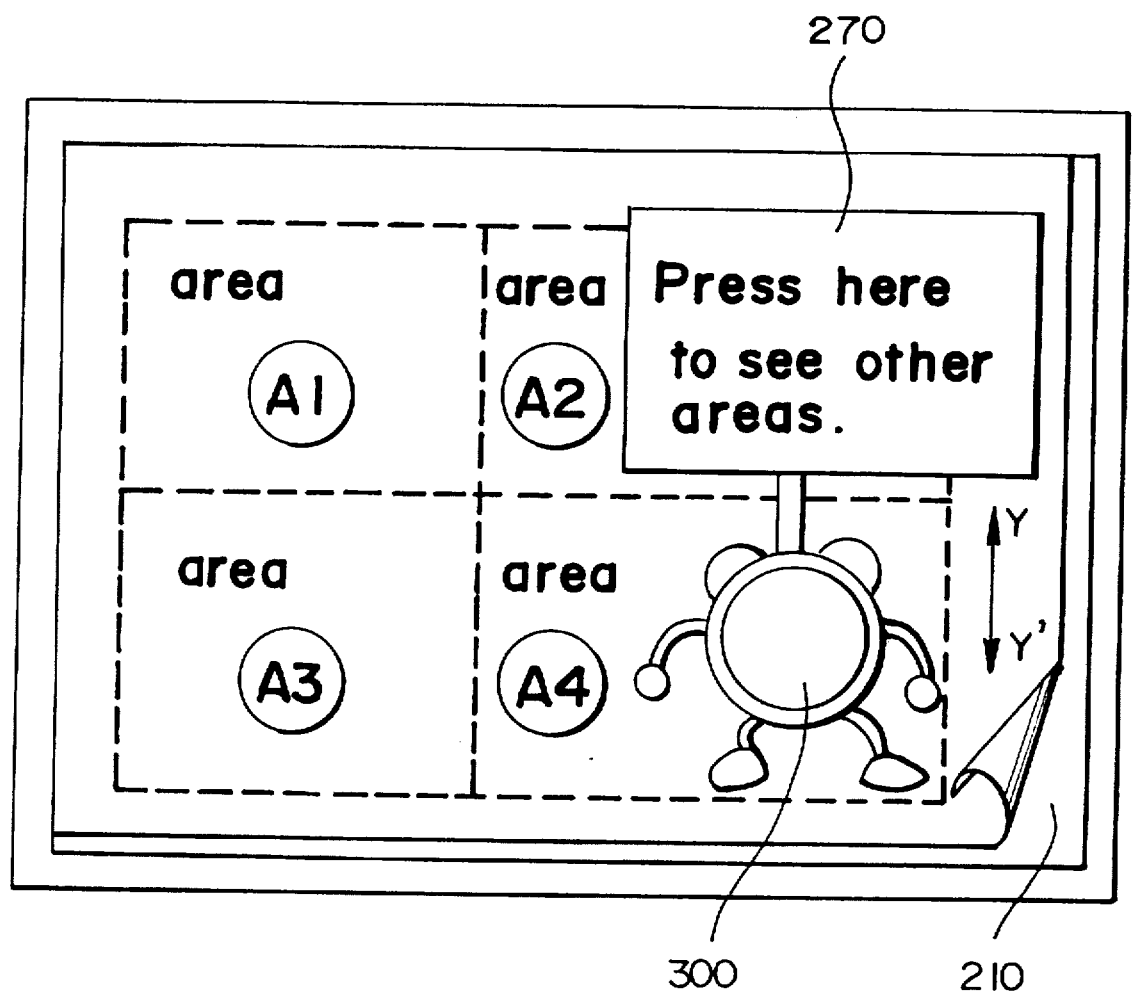
FIG. 25 is an explanatory view of a basic ride menu screen.

If the user touches the ride menu selection button 512, a basic ride menu screen appears on the display screen 42, as shown in FIG. 25 (step S310).

This basic ride menu screen displays four areas, a first area A1 to a fourth area A4, to represent areas A1 to A4 within the amusement park. In this case, each of the areas displays a simple animated image of a typical ride within that part of the amusement park, such as a roller coaster in area A1 and a Ferris wheel in area A2 (however, these animated images are omitted from the figure). In addition, a cartoon character 300 appears in such a manner as to overlay this area information. A sign 270 held by this cartoon character 300 has a written caption saying "Press here to see other areas," in a similar manner to that of the food menu. To see an area that is not displayed on this screen, the user touches the sign 270 and the next page of information (on four areas from A5 onward) is displayed with the same screen structure. Note that parts of the displayed information that is overlaid by the cartoon character 300 and the sign 270 will be obscured if the character stays in a fixed position without moving, so the cartoon character 300 and the sign 270 are made to move in a circuit along the path Y-Y', to made hidden captions visible. This enables efficient use of a limited display area.

In the same manner as with the food menu, the amount of area information displayed at a time is preferably enough for four areas within one display screen, as shown in FIG. 25, from consideration of the size of the display screen and size of area that a user can be expected to touch easily. Since each of these areas A1 to A4 also functions as an icon, details associated with an area are displayed on the screen if the region of that area is touched. For example, if the region of area A1 is touched, the display shown in FIG. 26 could appear (step S320). Note that the color of the background portion within the frame of the specified item (area A1, in this case) could be made to be different from the color of other items, in the same manner as with the food menu.

Figure 26:
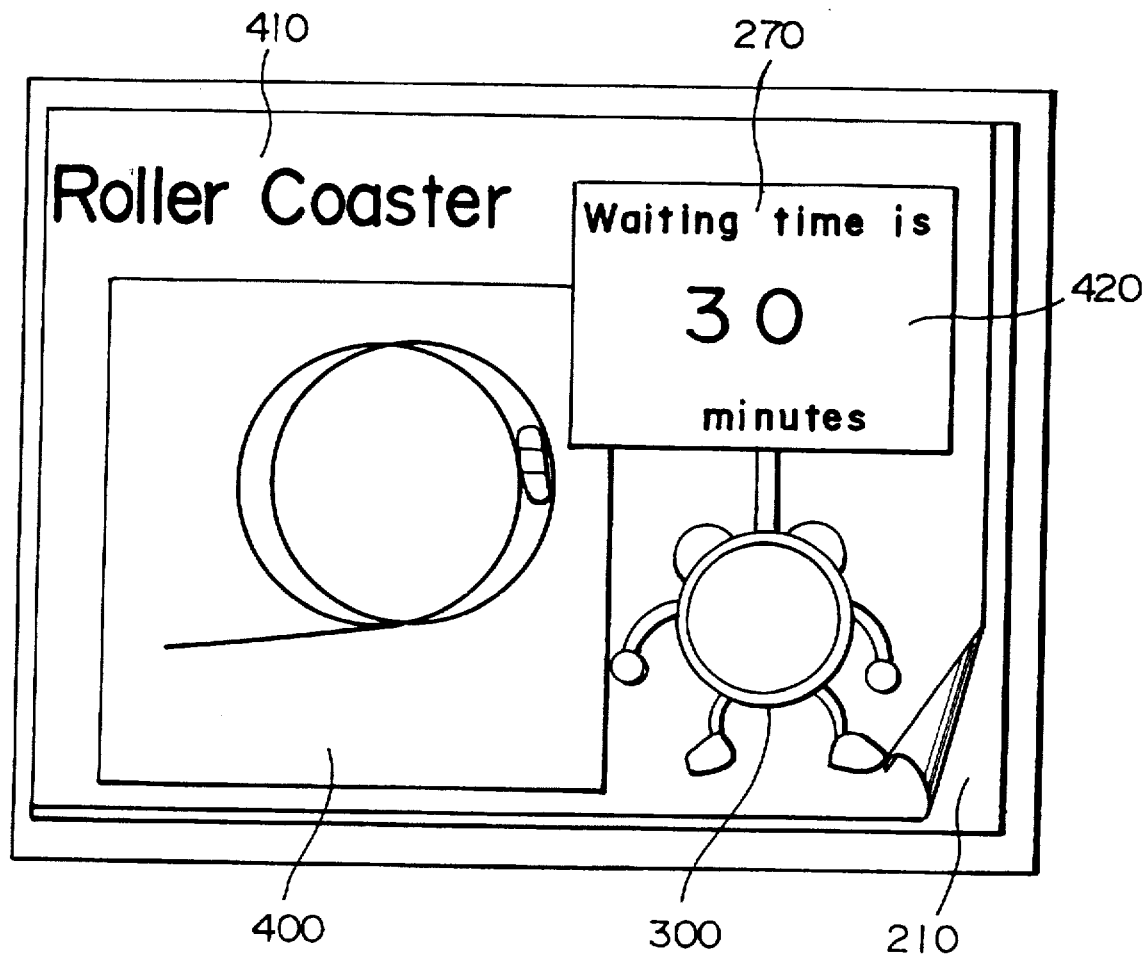
FIG. 26 is an explanatory view of a display screen for ride information.

Note that FIG. 26 shows the display that appears when area A1 is specified, in which case an animated image that expresses the concept of a roller coaster is shown on the screen in an easy-to-understand form. In addition to an animated image 400 of a roller coaster, the screen also shows a written caption 410 saying "Roller coaster" and another written caption 420 expressing the waiting time as "Waiting time is 30 minutes," together with the cartoon character 300. If the user presses the page-turning area 210 provided at the bottom right of the display screen, an animated image of another ride within the same area A1 is displayed instead of the currently displayed roller coaster. Every time the user presses the page-turning area 210 of the animated image representing a newly displayed ride, animated images of other rides within the same area are displayed one at a time in sequence.

The above description concerned a case in which information relating to the food menu and attractions at an amusement park are displayed, but the present invention can equally well be applied to a case in which a similar method is used to display "Event information" and "Other information" (not shown in the figure). If a user touches a major category such as "Event information" or "Other information" in such a configuration, animated images relating to about four items are first displayed to act as an index of the information belonging to that major category. If any one of those four categories is pressed, a first animated image belonging thereto is displayed. If there is another item available within this category, pressing the page-turning area 210 causes a similar second animated image to be displayed, pressing the page-turning area 210 again causes a similar third animated image to be displayed, and so on until all the images have been displayed in sequence by screen switching. Note that the display method in this case is substantially the same as that of the display of the food menu or attractions, so further description thereof is omitted.

In this manner, this embodiment of the invention makes it possible for an order entry system at a restaurant or similar site to display large quantities of multimedia information efficiently within a limited display space, and also display that information in a form that is easy for a user to understand. It also enables the user to perform the input operation easily, based on displayed information.

Figure 14:
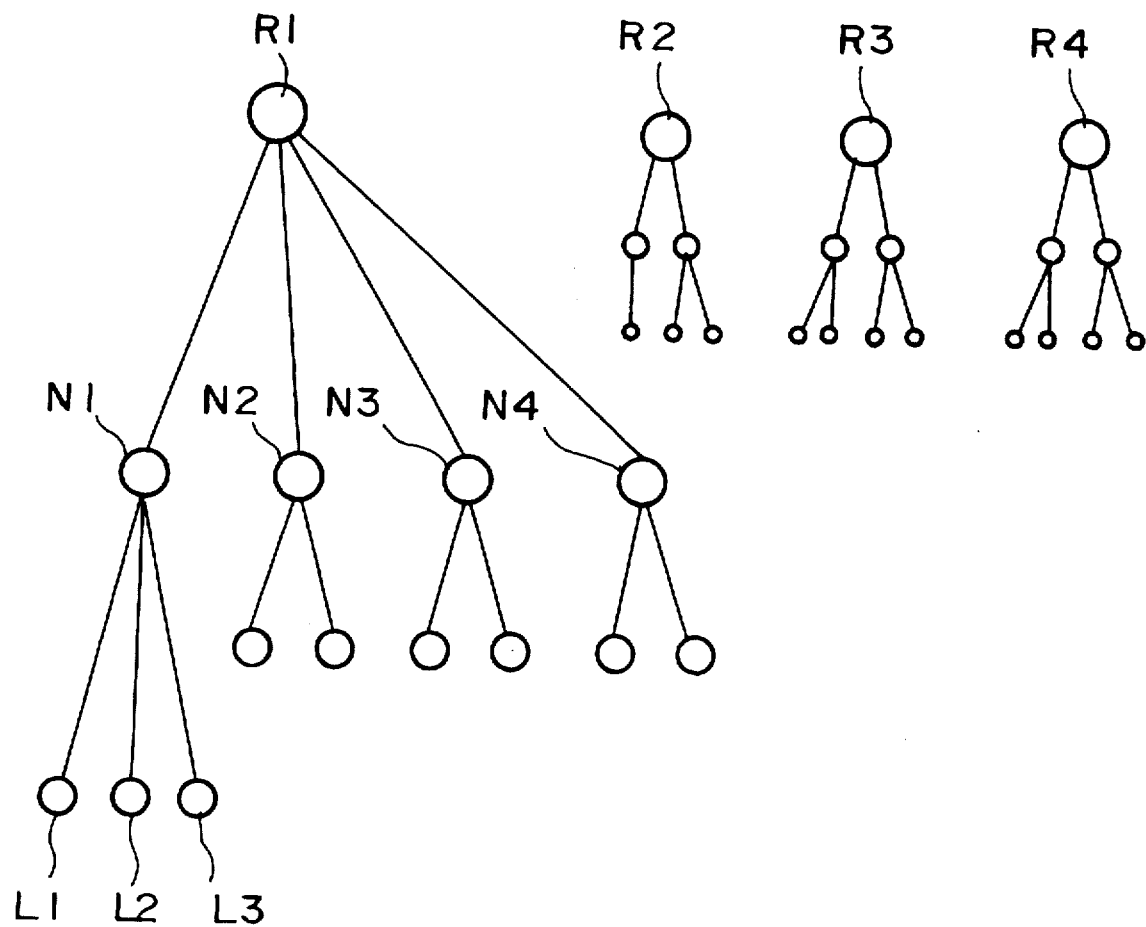
FIG. 14 is an explanatory view of the operation of the tree structure of hierarchical menu screens used in the system.

An example of the structure of hierarchical menu screens that are displayed in this manner is shown in FIG. 14.

In this structure, a plurality of items of multimedia information to be displayed is divided into a number of major categories, one for each type of information, and information within each of these categories is arranged in a tree structure belonging to that category. If one item of information in a hierarchical level corresponding to a root or node of this tree structure is selected, information in the next level belonging to the thus selected information is displayed. If there is a plurality of items of information to be displayed, the selection of one item of this information ensures that the display of information in the next level belonging to the selected information is processed in sequence. At the leaf level of the tree structure, a plurality of items of information corresponding to the selected leaf are switched to display one at a time.

If, for example, roots R1, R2, R3, and R4 in the tree structure of FIG. 14 are made to correspond to the above described second embodiment, root R1 would correspond to "Food menu selection", root R2 to "Event information", root R3 to "Attraction information", and root R4 to "Other information." Note that, in order to simplify the description below, only "Food menu selection" is discussed. Nodes N1, N2, N3, and N4 belonging to root R1 "Food menu selection" correspond to major categories 200-1 to 200-4 of the food menu in this case, as shown in FIG. 19. Similarly, leaves L1, L2, . . . belonging to node N1 of category 200-1, for example, correspond to different types of sandwich in this case, such as ham sandwich and salad sandwich.

The use of a display method of this type makes it possible to display a large quantity of varied information in an easily recognizable form, even if the screen can only display a small amount of space at a time. Since the image information that is displayed is animation information (mainly dynamic images, but a static image could also be used), information that the management particularly wants to attract the user's attention could be made more noticeable by making only the attention-attracting portion a dynamic image, or it could be made even more recognizable by various other contrivances. From the recognizability point of view, it is also preferable that the entire screen is used to display each type one-by-one, to make the images seem bigger. Note that a plurality of images could equally well be displayed simultaneously, within a range in which recognizability is not affected.

With this embodiment, the configuration is such that various types of animation information (image data) to be displayed are stored in the receive data storage section 54 provided in the terminal device 40, the user requests information from the touch-sensitive panel 44, and animation information is read out from an address corresponding to the input from the touch-sensitive panel 44. However, the configuration could be such that information other than this preset animation information is sent from the host computer 20 to each terminal device 40 at fixed intervals. This information could relate to the waiting times for rides or the starting times of events, or it could be information that changes with time such as news about lost property or straying children. The CPU 50 could accumulate the information sent from a central location as latest information in the memory 54 and display it as required.

In this manner, the system of this embodiment is configured in such a manner that animation image data that involves a large quantity of data that would require a long wait to transfer is held within the terminal device, and only information such as that which requires a short wait to transfer or numeric information is transferred to and from the host computer. Moreover, accumulating data from the host computer in the memory of the terminal device ensures that there is normally no need to receive data from the host computer. Thus the system of this embodiment is characterized in that it can be implemented even with an inexpensive network that can transfer only a small quantity of data.

It should be obvious to those skilled in the art that the above described embodiments are merely examples of the application of the present invention, and should not be taken as being limiting. For example, the major categories of this embodiment were specified as being "Food menu selection," "Event information," "Ride information," and "Other information." However, software such as various games could also be incorporated into the system. If the user touches a category of "Games," major categories of a number of games appear and the user can then select a preferred game from amongst these options.

In addition, although the above embodiments concerned examples in which the present invention was applied to order management in a restaurant, it should be obvious that the present invention is not limited thereto and various other embodiments can equally well be applied to other environments.

For example, the order-taking terminal devices 40 shown in FIG. 1 could be disposed at customers' seats at a sports ground such as a baseball stadium or soccer stadium, with the POS system 10 being located at a central product distribution center. The configuration could be such that, when an order is received from one of the order-taking terminal devices 40, the operator of the POS system 10 instructs the nearest vendor to that customer's seat to deliver the ordered products.

The order management system of the present invention is not necessarily applicable to a baseball stadium as described above; it can equally well be applied to another place of entertainment such as a theater. In such a case, the ordering of products from customers' seats in the theater can be facilitated by the provision of an order-taking terminal device at each of the customer's seats.

The order management system of the present invention is not limited to food and beverages in a restaurant as was described above, it can equally well be applied to the ordering of data relating to a popular player or actor in an entertainment site such as a sports ground, baseball stadium, or theater.

In such a case, the ordered data is preferably transmitted by radio from the POS system 10 to the corresponding terminal device 40, and it displayed on the display screen 42 of the terminal device 40.

In addition, if the present invention is applied to an entertainment site such as a baseball stadium or theater, it is not essential to display a menu screen when the system starts up. Advertising images could be displayed on each of the order-taking terminal devices by configuring the system in such a manner that data such as image data for predetermined advertisements is transmitted from the main management equipment to the order-taking terminal devices. This enables the system to respond rapidly to changes and additions to advertisements from sponsors, as well as to changes in the ordering menu.

The above embodiments were also described by way of example as relating to a system in which the on-site pos system and the order-taking terminal devices were connected by wireless circuitry, but they could equally well be connected by cables if necessary.

What is claimed is:

1. A terminal device for transferring interactive data to and from another device, comprising:

input means;

display means;

storage means for storing image data for a data transmission management screen wherein at least part of said image data is presented as a dynamic image, and an operating program for reproducing said image data in accordance with predetermined rules and managing data transmission; and computation control means for managing data transmission; wherein said computation control means, comprises:

image displaying means for reading said image data and displaying a data transmission management screen on said display means based on said operating program; and control means for generating first order data based on said operating program and an input from said input means in response to said data transmission management screen, transmitting said first order data to said other device, and managing display of a screen with details corresponding to interactive second data on said image displaying means based on said second data received from said other device; and wherein said image data is image data for an order management screen;

said operating program reproduces image data for order management in accordance with predetermined rules and manages data transmission for order management;

said image displaying means reads out said image data based on said operating program and displays said order management screen on said display means; and said control means generates first order management data based on said operating program and an order input from said input means in response to said order management screen, transmits said first order management data to said other device, and manages display of an order management screen with details corresponding to interactive second data on said image displaying means based on said second data received from said other device.

2. The terminal device as defined in claim 1, wherein said input means is a touch-sensitive panel disposed on said display means in a predetermined mutual relationship with said management screen.

3. The terminal device as defined in claim 1, wherein said image data displays a menu screen representing a plurality of management categories as said management screen.

4. The terminal device as defined in claim 1, wherein said storage means stores image data for an order menu screen representing a plurality of ordering categories as said management screen; and said control means converts an ordering category selected by said input means into code data and transmits said code data as said first order data, and displays an order management screen with details which are code data received as said second data from said other device on said image displaying means.

5. The terminal device as defined in claim 1, wherein said storage means stores a plurality of sets of said image data and operating programs; and said control means manages data transmission based on remaining sets of image data and operating program during a waiting time during which data transmission is being managed based on a predetermined set of image data and operating program.

6. The terminal device as defined in claim 5, wherein said storage means stores a plurality of sets of said image data and associated display operating programs for product ordering and information ordering; and said control means performs ordering control based on image data for information ordering and an associated display operating program from a time at which said first order data is transmitted until when said second data is received, during ordering control based on image data for produce ordering and an associated operating program.

7. The terminal device as defined in claim 6, wherein said control means comprises means for writing into said storage means said image data and an associated display operating program which are received from said other device.

8. The terminal device as defined in claim 1, wherein said control means comprises means for writing into said storage means said image data and an associated display operating program which are received from said other device.

9. The terminal device as defined in claim 1, wherein said image data displays hierarchical menu screens representing a plurality of management items as said management screen.

10. The terminal device as define in claim 9, wherein said image data includes transmission items divided into a number of major categories according to type, items belonging to each of said major categories further divided into a tree structure within that major category, so as to display order management menu screens in a hierarchy; and said operating program displays a menu screen representing items in a level next to a hierarchical level corresponding to one of root and node portions of the displayed tree structure, said next level belonging to a category selected by a user from categories of the hierarchical level, and said operating program switches menu screens representing each of items belonging to a same leaf portion of said tree structure to display a menu screen based on screen changing order from said control means.

11. The terminal device as defined in claim 10, wherein display contents of each item belonging to a hierarchical level corresponding to said one of root and node portions is an image acting as an index representing the contents of said item, at least parts of said image function as icons; and said image displaying means displays a menu containing the item corresponding thereto when one of said icons is selected by said input means.

12. The terminal device as defined in claim 11, wherein said image displaying means identifies and displays a selected icon and a non-selected icon.

13. The terminal device as defined in claim 12, wherein said image displaying means displays a display change area on a screen and switches the image which is displayed when said display change area is selected by said input means so as to display plurality of items corresponding to a leaf portion of said tree structure.

14. The terminal device as defined in claim 13, wherein said image displaying means displays explanatory information for explaining details of information displayed on a display screen so as to overlay said display information with said explanatory information, and causes said explanatory information to move so that the contents of said display information in the overlaid area are recognizable.

15. A terminal device for transmitting data to another device, comprising:

input means;

display means;

storage means for storing image data for a data transmission management screen wherein at least part of said image data is presented as a dynamic image, and an operating program for reproducing said image data in accordance with predetermined rules and managing data transmission; and computation control means for managing data transmission;

wherein said computation control means, comprises:
  image displaying means for reading said image data and displaying a data transmission management screen on said display means based on said operating program; and
  control means for generating transfer data based on said operating program and input from said input means in response to said data transmission management screen, and managing the transmission of data to said other device; and
  wherein said image data is image data for an order management screen;
  said operating program reproduces image data for order management in accordance with predetermined rules and manages data transmission for order management;
  said image displaying means reads out said image data based on said operating program and displays said order management screen on said display means; and
  said control means generates order management data based on said operating program and an order input from said input means in response to said order management screen, and controls the transmission of said order to said other device.

16. The terminal device as defined in claim 15, wherein said input means is a touch-sensitive panel disposed on said display means in a predetermined mutual relationship with said management screen.

17. The terminal device as defined in claim 15, wherein said image data displays a menu screen representing a plurality of management categories as said management screen.

18. The terminal device as defined in claim 15, wherein said image data displays hierarchical menu screens representing a plurality of management items as said management screen.

19. The terminal device as defined in claim 18, wherein said image data includes transmission items divided into a number of major categories according to type, items belonging to each of said major categories further divided into a tree structure within that major category, so as to display order management menu screens in a hierarchy; and said operating program displays a menu screen representing items in a level next to a hierarchical level corresponding to one of root and node portions of the displayed tree structure, said next level belonging to a category selected by a user from categories of the hierarchical level, and said operating program switches menu screens representing each of items belonging to a same leaf portion of said tree structure to display a menu screen based on screen changing order from said second control means.

20. The terminal device as defined in claim 19, wherein display contents of each item belonging to a hierarchical level corresponding to said one of root and node portions is an image acting as an index representing the contents of said item, at least parts of said index data function as icons; and said image displaying means displays a menu containing the item corresponding thereto when one of said icons is selected by means of said input means.

21. The terminal device as defined in claim 20, wherein said image displaying means identifies and displays a selected icon and a non-selected icon.

22. The terminal device as defined in claim 21, wherein said image displaying means displays a display change area on a screen and switches the image which is displayed when said display change area is selected by said input means so as to display plurality of items corresponding to a leaf portion of said tree structure.

23. The terminal device as defined in claim 22, wherein said image displaying means displays explanatory information for explaining details of information displayed on a display screen so as to overlay said display information with said explanatory information, and causes said explanatory information to move so that the contents of said display information in the overlaid area are recognizable.

24. A terminal device for transmitting data to another device, comprising:

input means;

display means;

storage means for storing image data for a data transmission management screen wherein at least part of said image data is presented as a dynamic image, and an operating program for reproducing said image data in accordance with predetermined rules and managing data transmission; and computation control means for managing data transmission; wherein said computation control means comprises:
  image displaying means for reading said image data and displaying a data transmission management screen on said display means based on said operating program;
  control means for generating transfer data based on said operating program and input from said input means in response to said data transmission management screen, and managing the transmission of data to said other device;
  wherein said other device comprises a host computer for down-loading said image data and associated display operating program to said terminal upon start-up;
  wherein said image data is image data for an order management screen;

said operating program reproduces image data for order management in accordance with predetermined rules and manages data transmission for order management;

said image displaying means reads out said image data based on said operating program and displays said order management screen on said display means; and said control means generates first order management data based on said operating program and an order input from said input means in response to said order management screen, transmits said first order management data to said other device, and manages display of an order management screen with details corresponding to interactive second data on said image displaying screen means based on said second data received from said other device.

25. A terminal device for transmitting data to another device, comprising:

input means;

display means;

storage means for storing image data for a data transmission management screen wherein at least part of said image data is presented as a dynamic image, and an operating program for reproducing said image data in accordance with predetermined rules and managing data transmission; and computation control means for managing data transmission; wherein said computation control means comprises:

image displaying means for reading said image data and displaying a data transmission management screen on said display means based on said operating program;

control means for generating transfer data based on said operating program and input from said input means in response to said data transmission management screen, and managing the transmission of data to said other device;

wherein said other device comprises a host computer for down-loading said image data and associated display operating program to said terminal upon start-up;

wherein said image data displays hierarchical menu screens representing a plurality of management items as said management screen;

wherein said image data includes transmission items divided into a number of major categories according to type, items belonging to each of said major categories further divided into a tree structure within that major category, so as to display order management menu screens in a hierarchy; and said operating program displays a menu screen representing items in a level next to a hierarchical level corresponding to one of root and node portions of the displayed tree structure, said next level belonging to a category selected by a user from categories of the hierarchical level, and said operating program switches menu screens representing each of items belonging to a same leaf portion of said tree structure to display a menu screen based on screen changing order from said control means.

26. A terminal device for transferring interactive data to and from another device, comprising:

input means;

display means;

storage means for storing image data for a data transmission management screen wherein at least part of said image data is presented as a dynamic image, and an operating program for reproducing said image data in accordance with predetermined rules and managing data transmission; and computation control means for managing data transmission; wherein said computation control means, comprises:

image displaying means for reading said image data and displaying a data transmission management screen on said display means based on said operating program; and control means for generating first order data based on said operating program and an input from said input means in response to said data transmission management screen transmitting said first order data to said other device, and managing display of a screen with details corresponding to interactive second data on said image displaying means based on said second data received from said other device; and wherein said other device comprises a host computer for down-loading said image data and associated display operating program to said terminal upon start-up.

27. The terminal device as defined in claim 26, wherein said image data is image data for an order management screen;

said operating program reproduces image data for order management in accordance with predetermined rules and manages data transmission for order management;

said image displaying means reads out said image data based on said operating program and displays said order management screen on said display means; and said control means generates first order management data based on said operating program and an order input from said input means in response to said order management screen, transmits said first order management data to said other device, and manages display of an order management screen with details corresponding to interactive second data on said image displaying means based on said second data received from said other device.

28. The terminal device as defined in claim 26, wherein said image data displays hierarchical menu screens representing a plurality of management items as said management screen.

29. The terminal device as defined in claim 28, wherein said image data includes transmission items divided into a number of major categories according to type, items belonging to each of said major categories further divided into a tree structure within that major category, so as to display order management menu screens in a hierarchy; and said operating program displays a menu screen representing items in a level next to a hierarchical level corresponding to one of root and node portions of the displayed tree structure, said next level belonging to a category selected by a user from categories of the hierarchical level, and said operating program switches menu screens representing each of items belonging to a same leaf portion of said tree structure to display a menu screen based on screen changing order from said control means.

30. A method of operating a terminal device for transmitting data to another device, comprising:

storing image data for a data transmission management screen wherein at least part of said image data is presented as a dynamic image, and storing an operating program for reproducing said image data in accordance with predetermined rules and managing data transmission; and managing data transmission;

wherein said managing data transmission step comprises:

reading said image data and displaying a data transmission management screen on a display based on said operating program; and generating transfer data based on said operating program and input from an input means in response to said data transmission management screen, and managing the transmission of data to said other device; and wherein said image data is image data for an order management screen; and further comprising:

reading out said image data based on said operating program and displaying said order management screen on said display; and generating order management data based on said operating program and an order input from said input means in response to said order management screen, and controlling the transmission of said order to said other device.

31. A method of operating a terminal device for transferring interactive data to and from another device, comprising:

storing image data for a data transmission management screen wherein at least part of said image data is presented as a dynamic image, and storing an operating program for reproducing said image data in accordance with predetermined rules and managing data transmission; and managing data transmission; wherein said managing data transmission step comprises:

reading said image data and displaying a data transmission management screen on a display based on said operating program; and generating first order data based on said operating program and an input from an input means in response to said data transmission management screen, transmitting said first order data to said other device, and managing display of a screen with details corresponding to interactive second data on said display based on said second data received from said other device; and wherein said image data is image data for an order management screen; and further comprising:

reproducing image data for order management in accordance with predetermined rules and managing data transmission for order management;

reading out said image data based on said operating program and displaying said order management screen on said display; and generating first order management data based on said operating program and an order input from said input means in response to said order management screen, transmitting said first order management data to said other device, and managing display of an order management screen with details corresponding to interactive second data on said display based on said second data received from said other device.

32. A method of operating a terminal device for transferring interactive data to and from another device, comprising:

storing image data for a data transmission management screen wherein at least part of said image data is presented as a dynamic image, and storing an operating program for reproducing said image data in accordance with predetermined rules and managing data transmission; and managing data transmission; wherein said managing data transmission step comprises:

reading said image data and displaying a data transmission management screen on a display based on said operating program; and generating first order data based on said operating program and an input from an input means in response to said data transmission management screen, transmitting said first order data to said other device, and managing display of a screen with details corresponding to interactive second data on said display based on said second data received from said other device; and wherein said other device comprises a host computer and further comprising down-loading said image data and associated display operating program from said host computer to said terminal upon start-up.

* * * * *

UNITED STATES PATENT AND TRADEMARK OFFICE
CERTIFICATE OF CORRECTION

PATENT NO.    : 5,912,743
DATED         : June 15, 1999
INVENTOR(S)   : Tadashi Kinebuchi, et al.

It is certified that an error appears in the above identified patent and that said Letters Patent is hereby corrected as shown below:

Column 23, line 14, delete "screen".

Signed and Sealed this

Seventh Day of December, 1999

*Attest:*

Q. TODD DICKINSON

*Attesting Officer*      *Acting Commissioner of Patents and Trademarks*